C. WAGNER & F. X. MALOCSAY.
BANDING MACHINE.
APPLICATION FILED APR. 26, 1907.

920,698.

Patented May 4, 1909.
19 SHEETS—SHEET 8.

WITNESSES
W. M. Avery
Rev. J. Hostetz

INVENTORS
Charles Wagner
Francis X. Malocsay
BY
Munn & Co.
ATTORNEYS

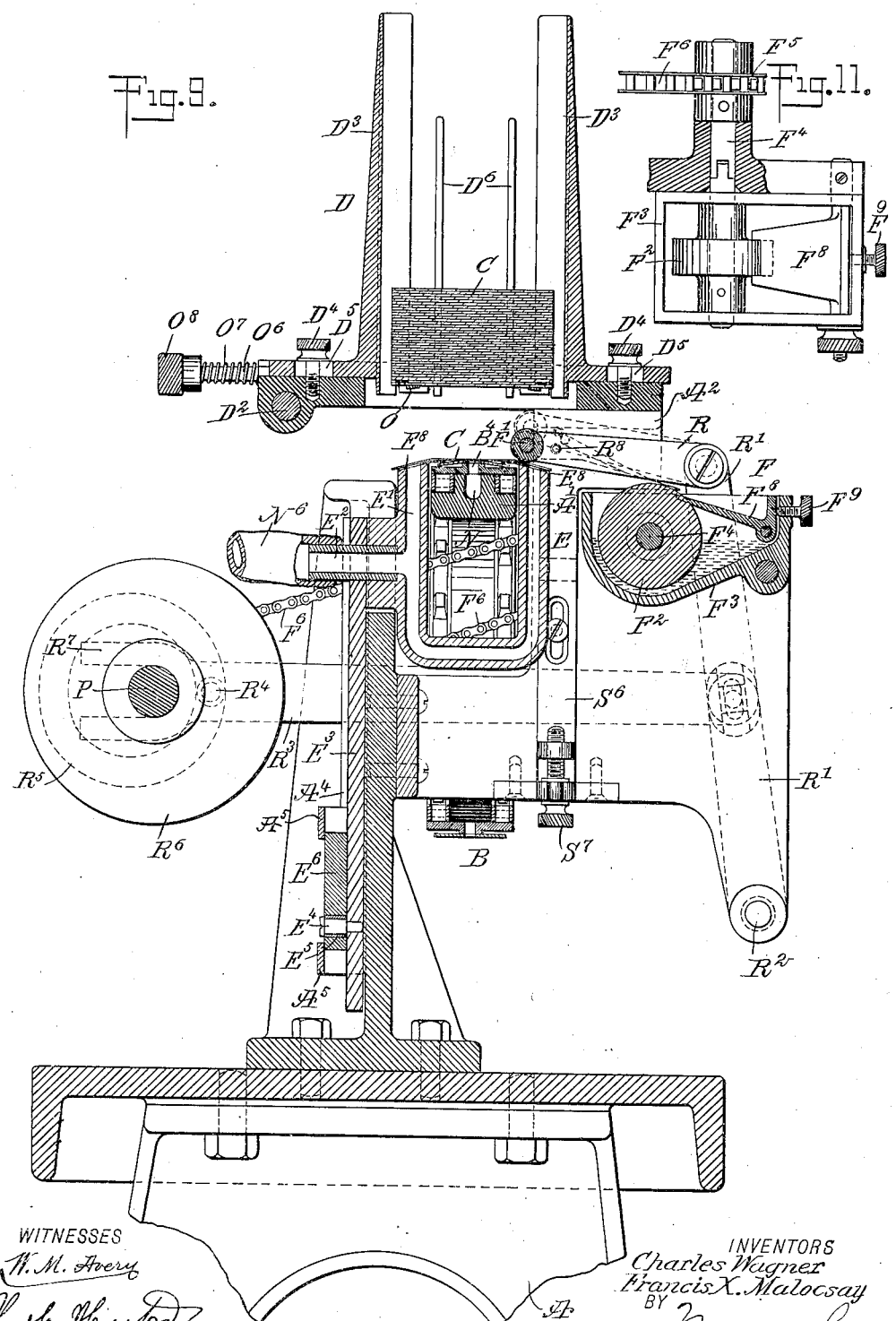

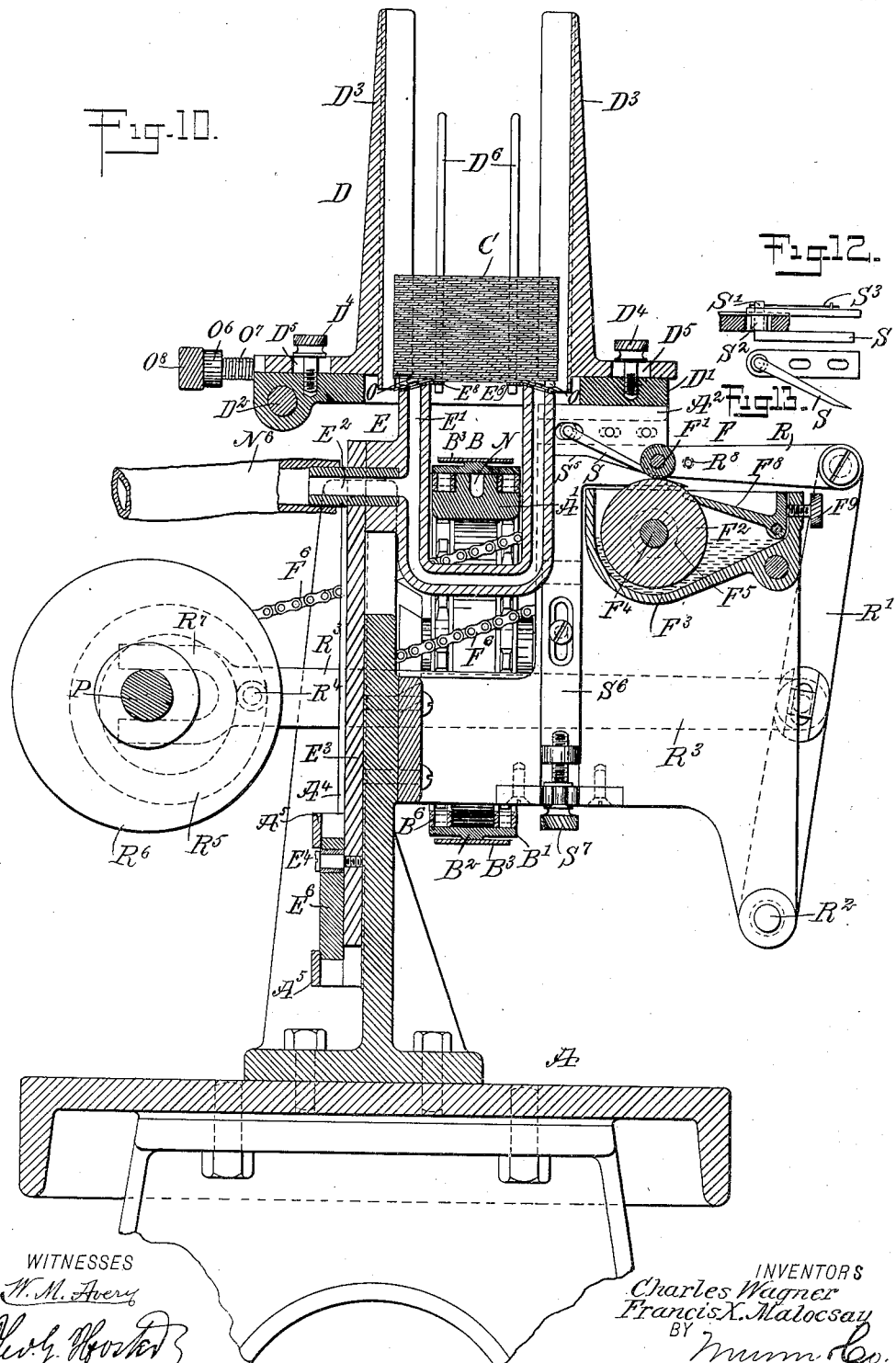

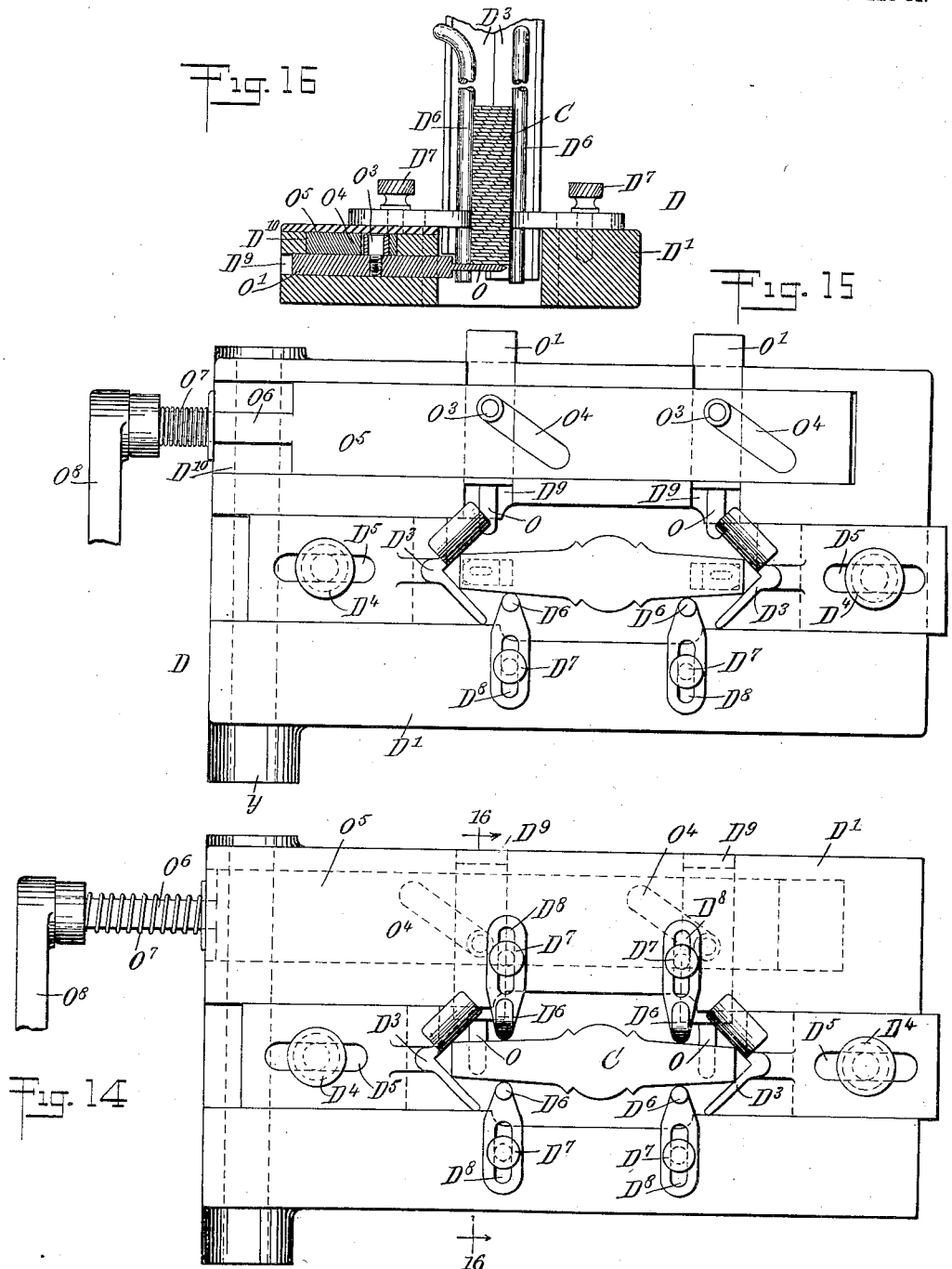

C. WAGNER & F. X. MALOCSAY.
BANDING MACHINE.
APPLICATION FILED APR. 26, 1907.
920,698.
Patented May 4, 1909.
19 SHEETS—SHEET 12.
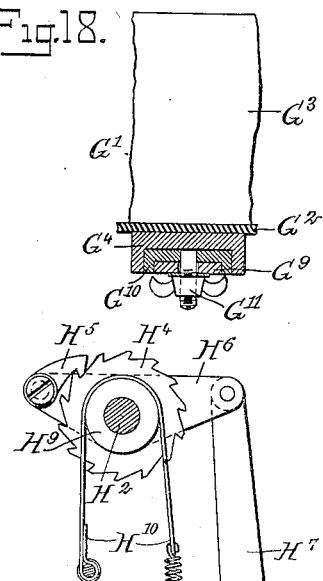
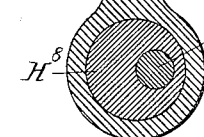
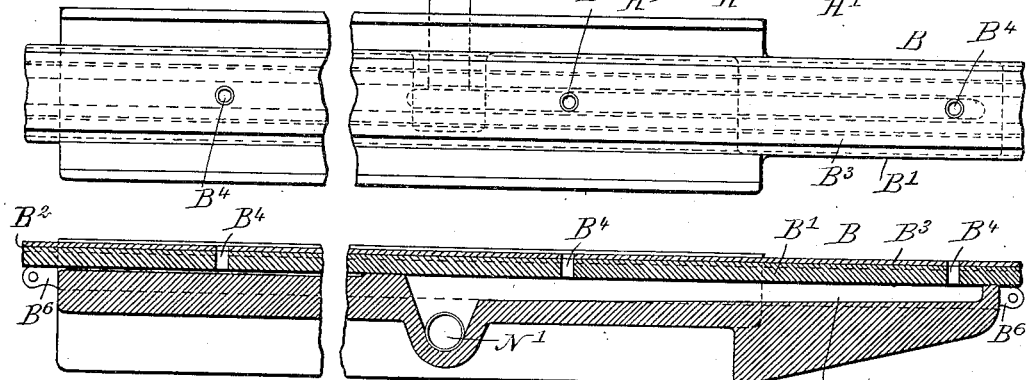
WITNESSES:
INVENTORS
Charles Wagner
Francis X. Malocsay
BY Munn & Co.
ATTORNEYS

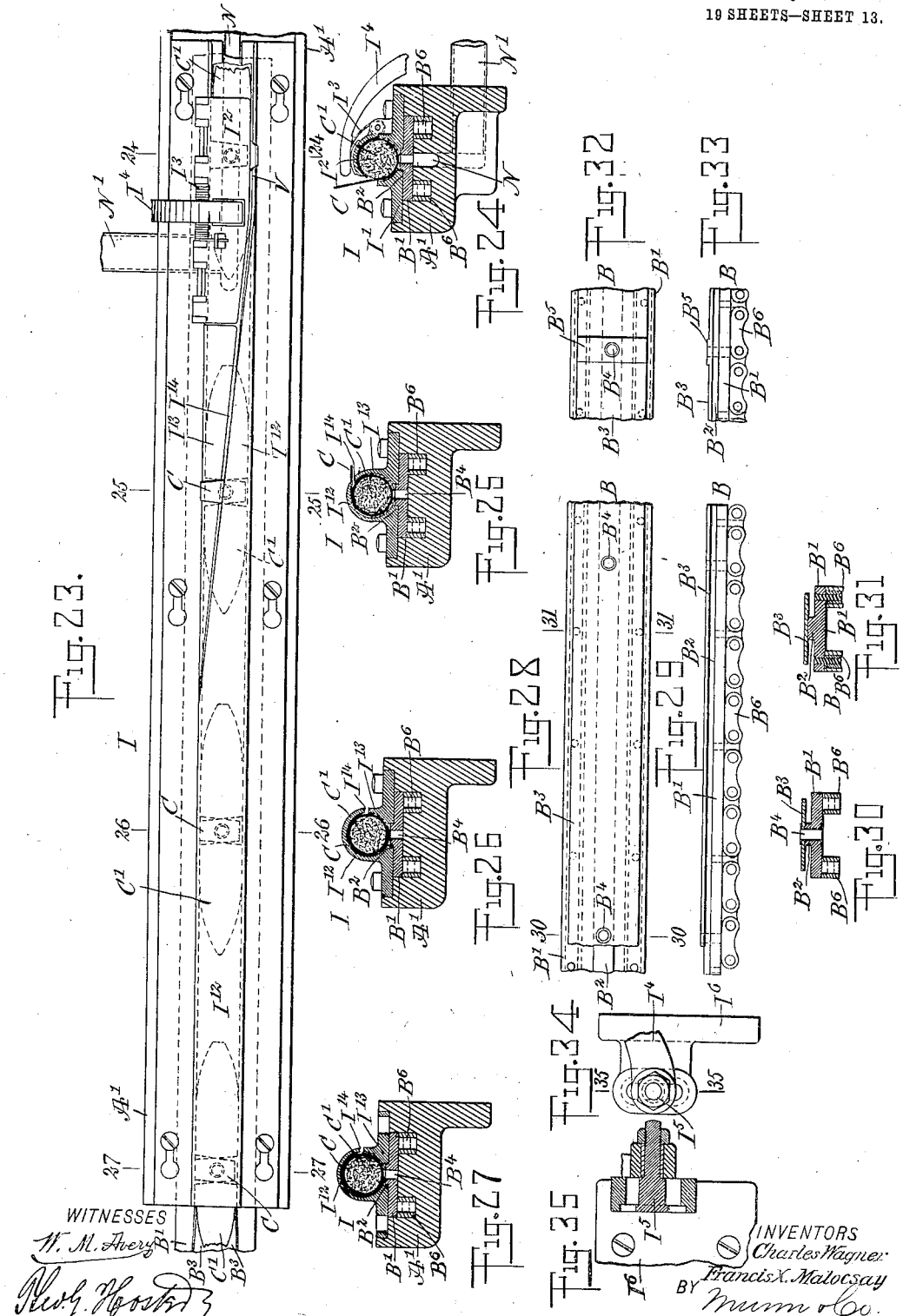

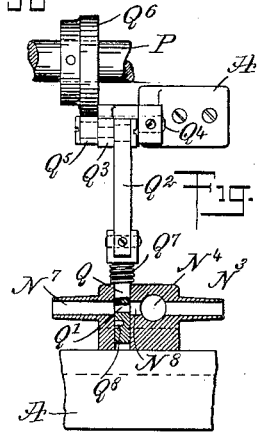
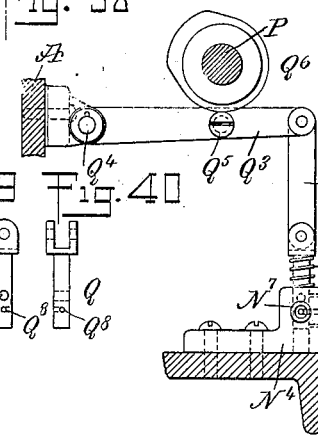
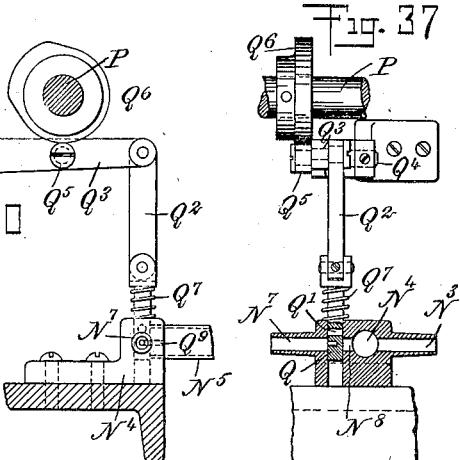
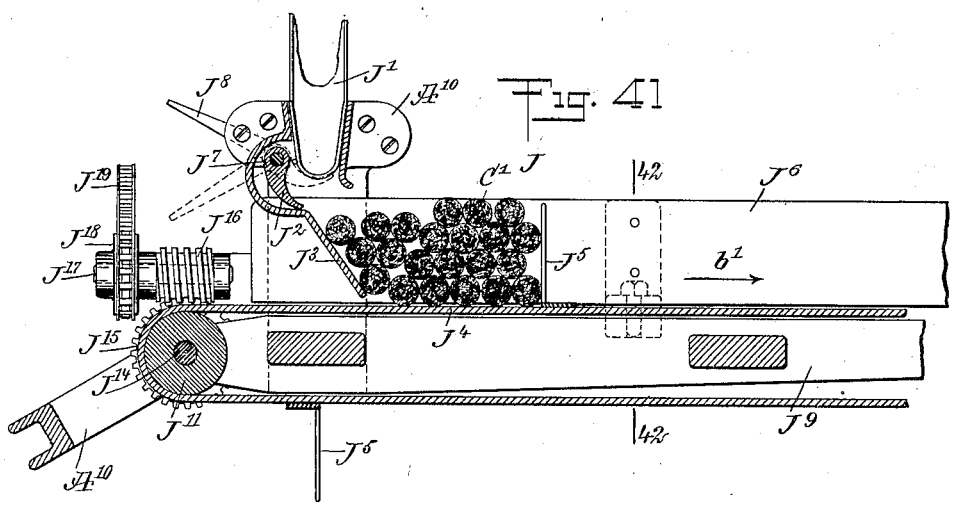
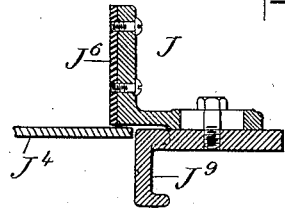
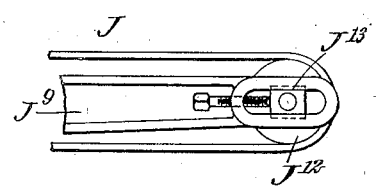

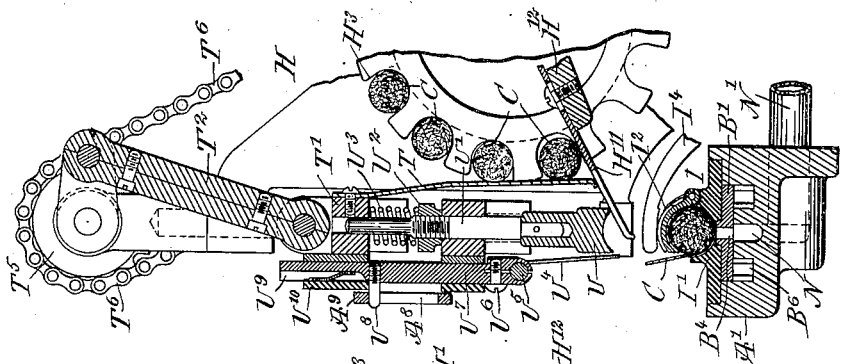
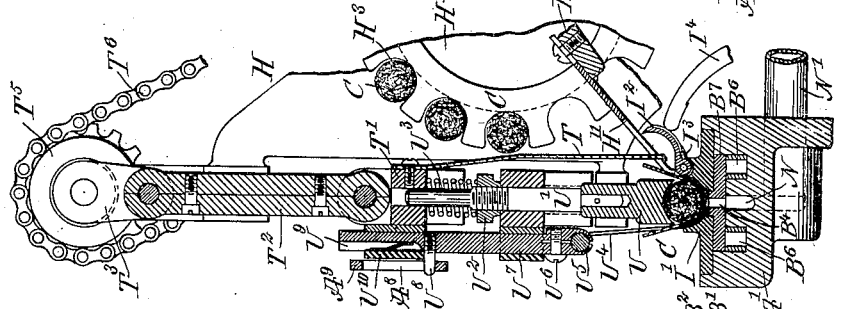
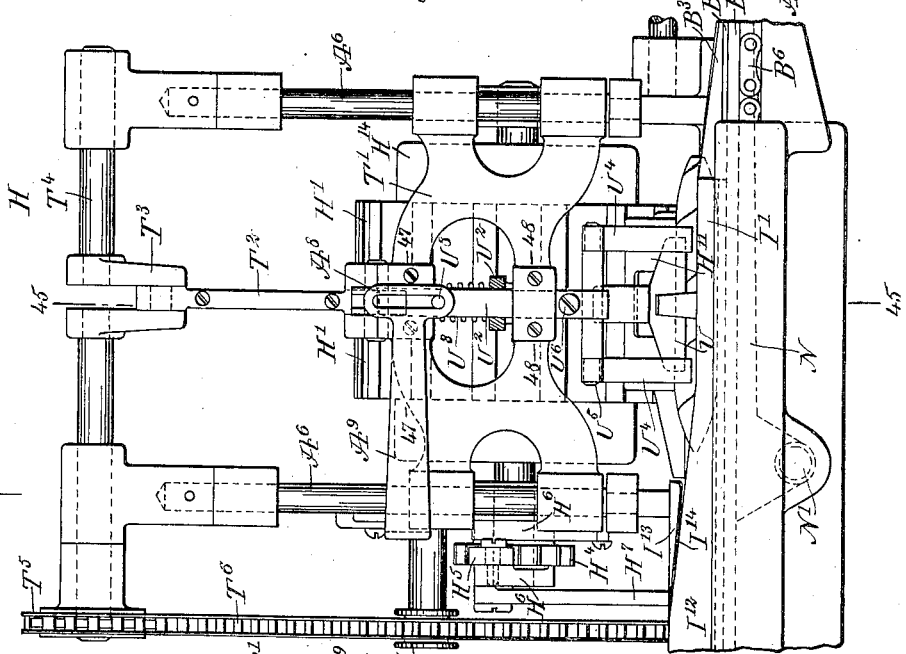
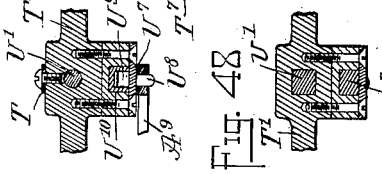

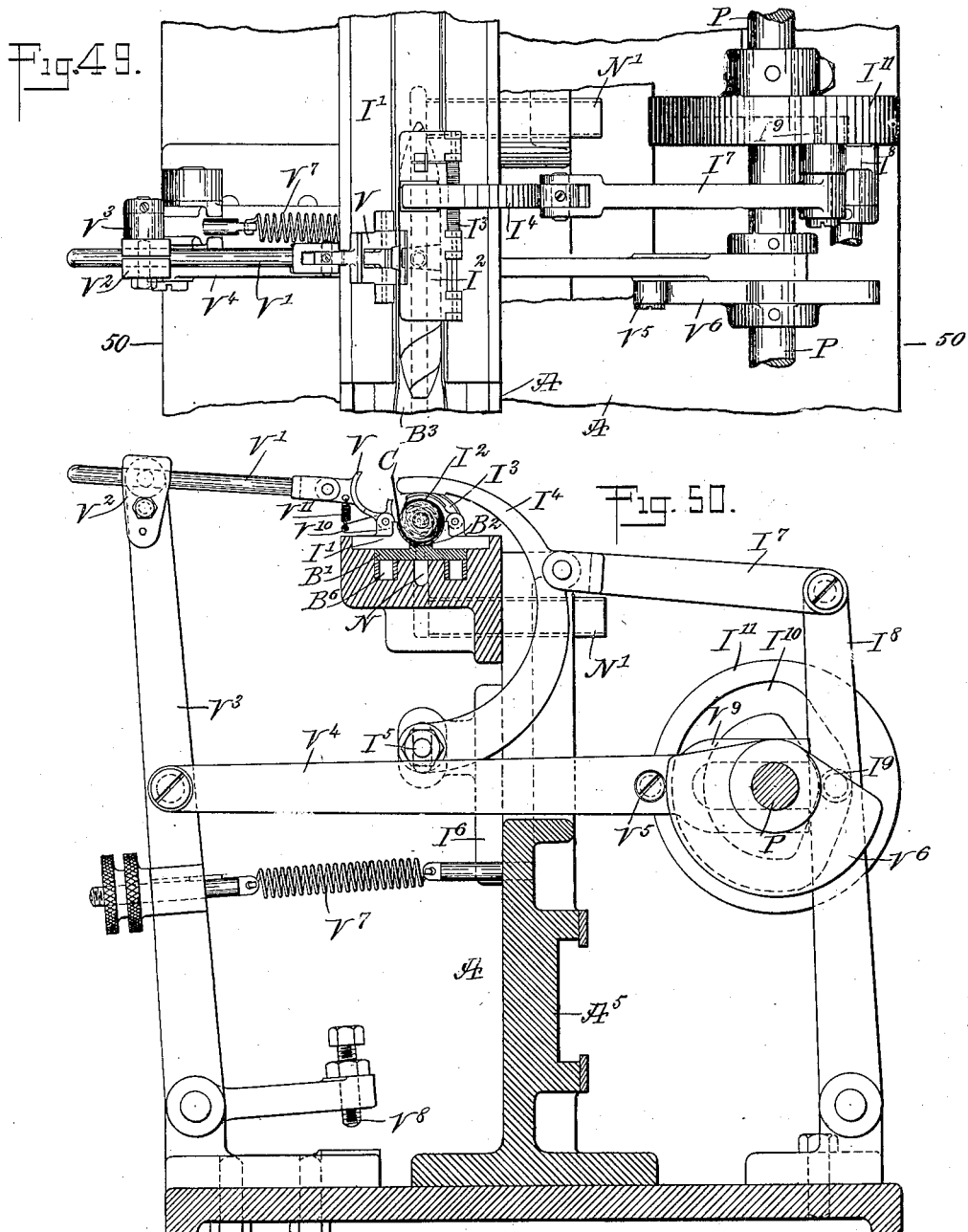

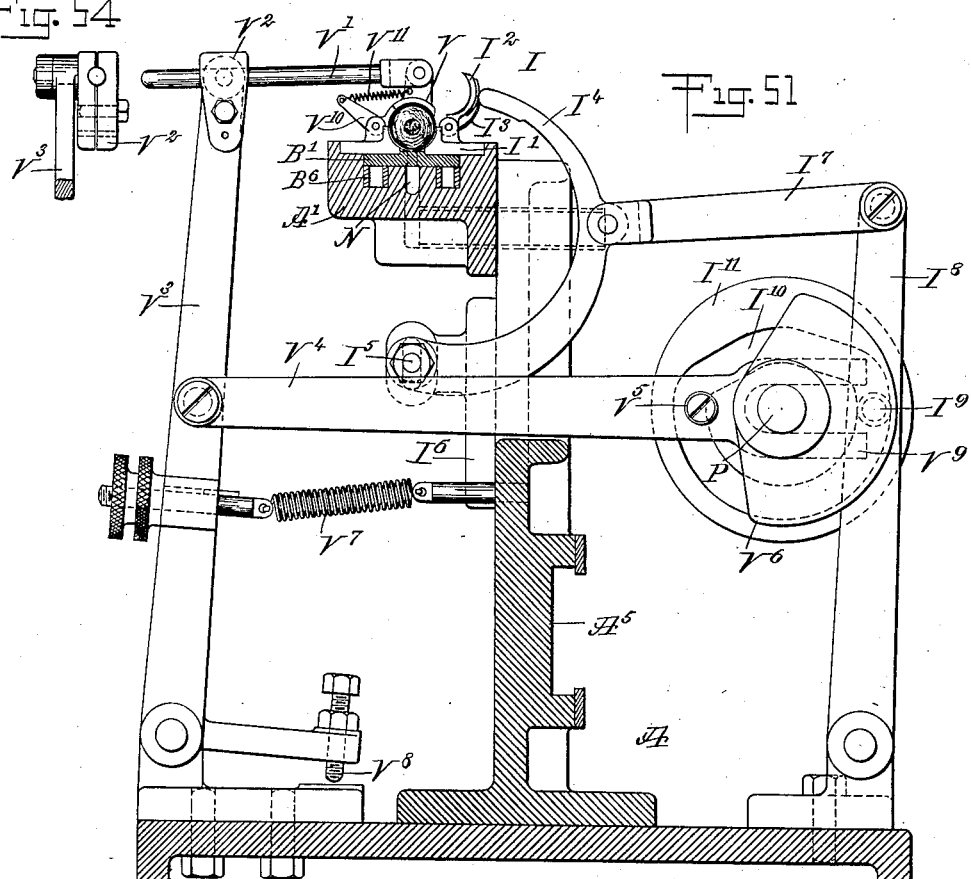

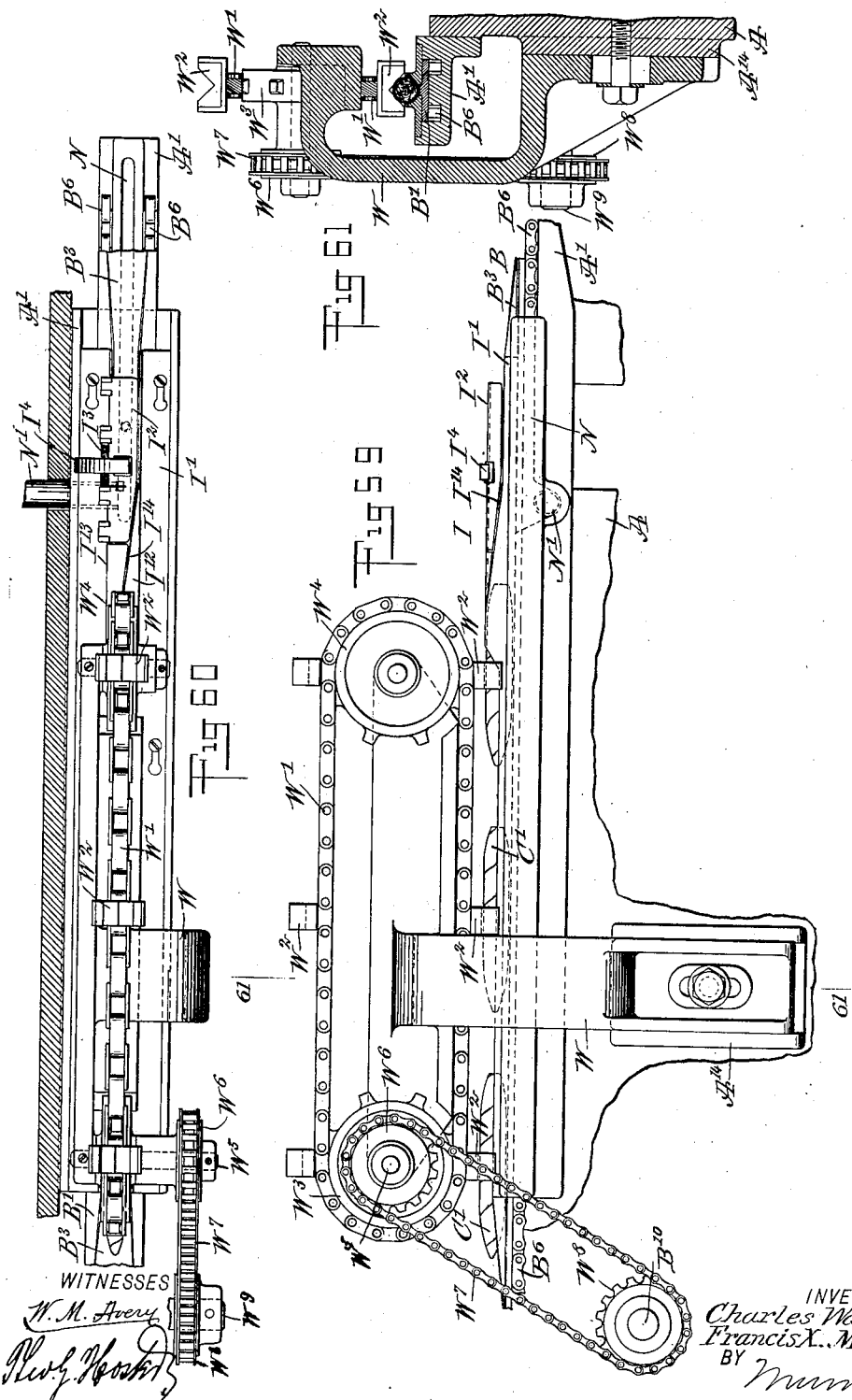

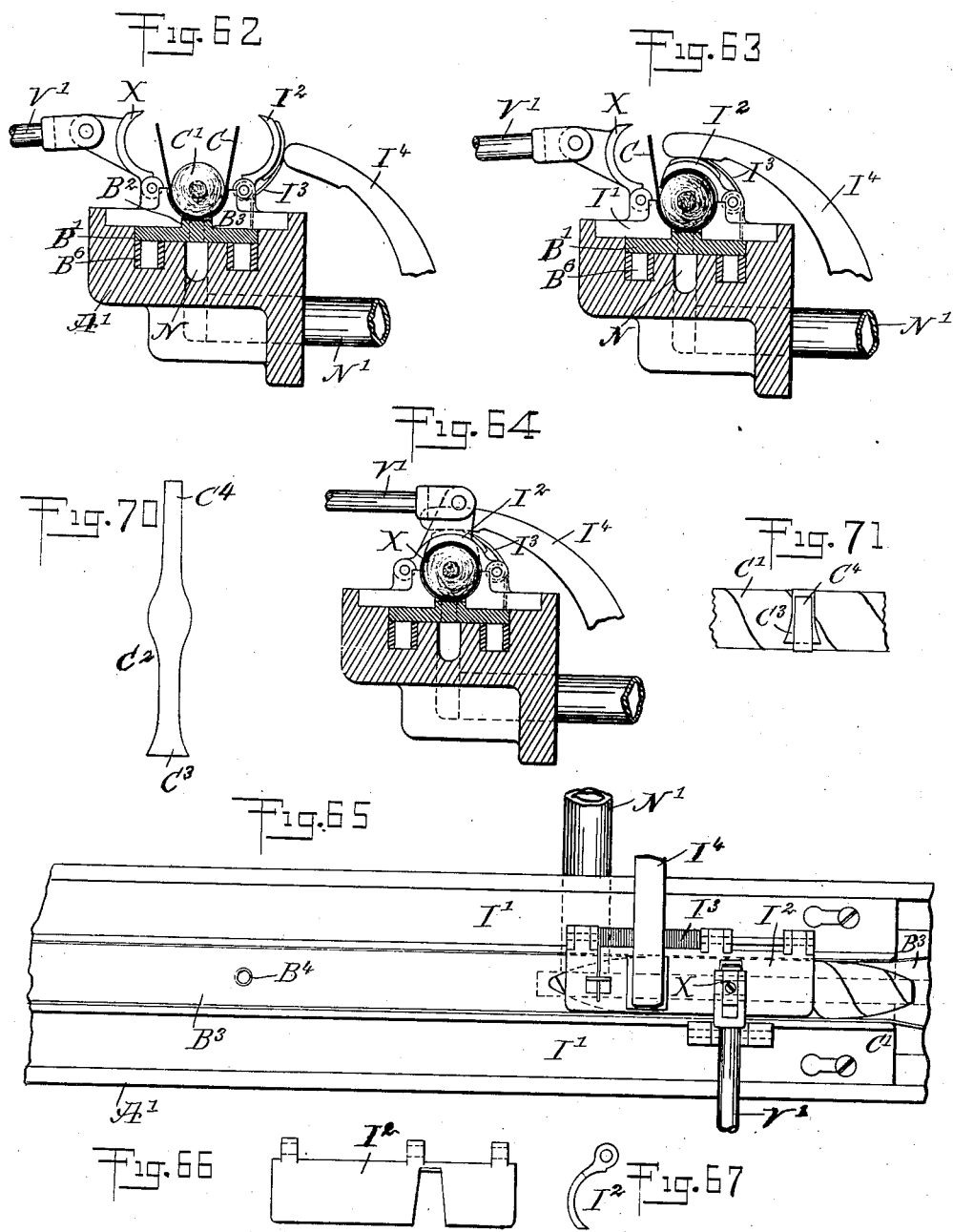

UNITED STATES PATENT OFFICE.

CHARLES WAGNER AND FRANCIS X. MALOCSAY, OF NEW YORK, N. Y., ASSIGNORS TO INTERNATIONAL BANDING MACHINE COMPANY, OF NEW YORK, N. Y., A CORPORATION OF NEW YORK.

BANDING-MACHINE.

No. 920,698.        Specification of Letters Patent.        Patented May 4, 1909.

Application filed April 26, 1907. Serial No. 370,431.

*To all whom it may concern:*

Be it known that we, CHARLES WAGNER and FRANCIS X. MALOCSAY, both citizens of the United States, and residents of the city of New York, borough of Manhattan, in the county and State of New York, have invented a new and Improved Banding-Machine, of which the following is a full, clear, and exact description.

The object of the invention is to provide a new and improved banding machine, designed for rapidly and accurately applying bands or labels to cigars and other articles, and arranged to gum bands or labels, to wrap the same snugly around the articles and secure their overlapping ends together without danger of injury to the articles or to the bands or the labels.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1:
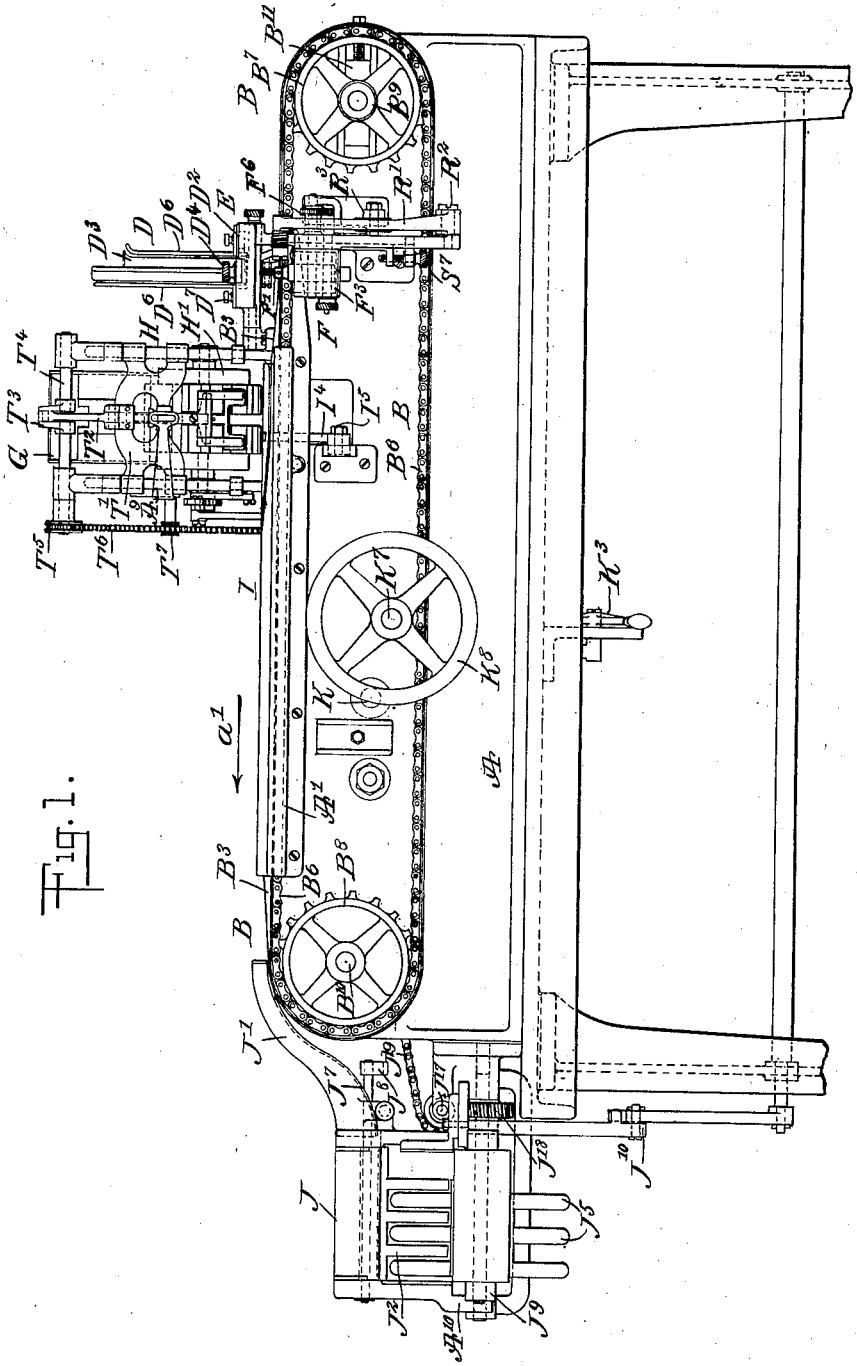
Figure 2:
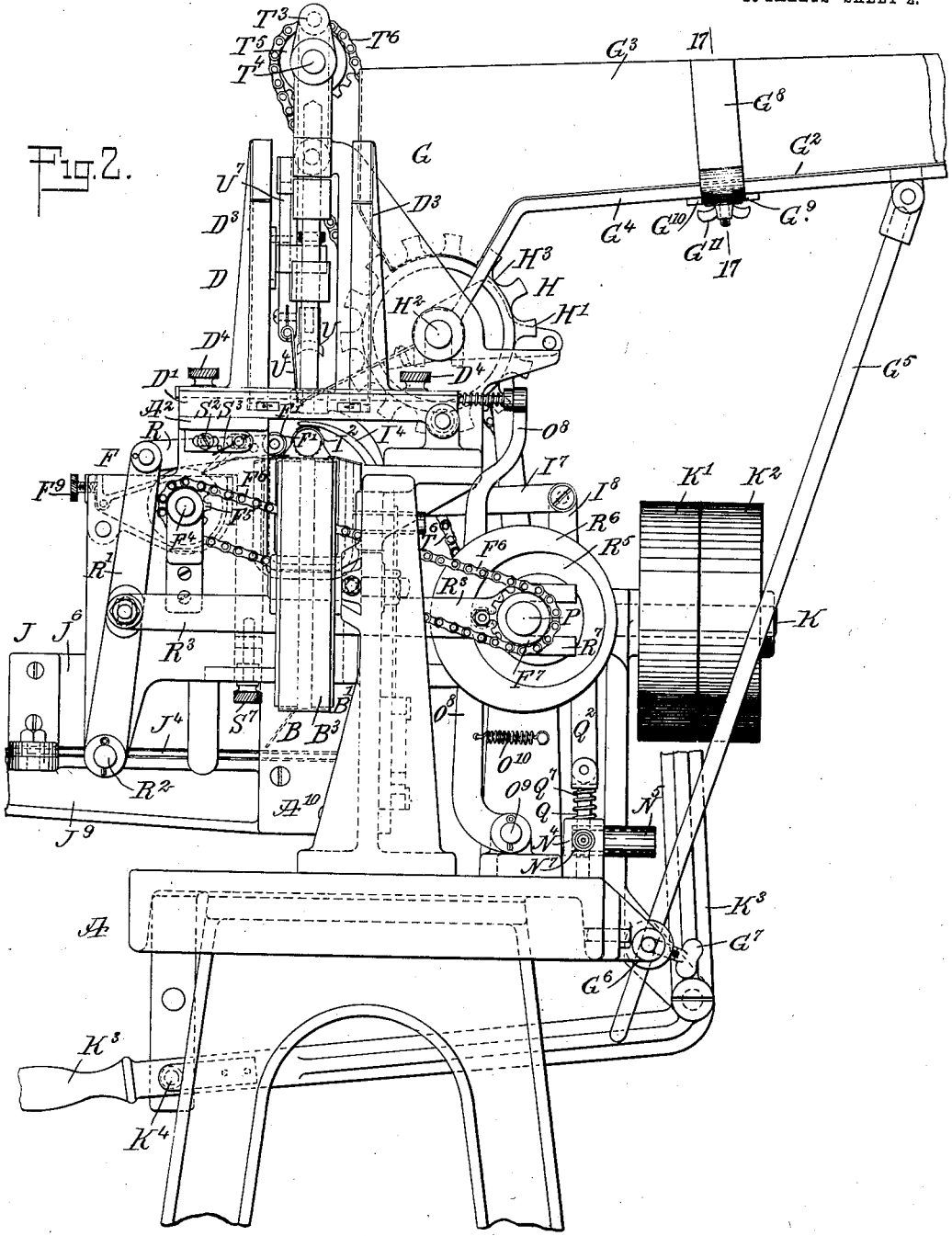
Figure 3:
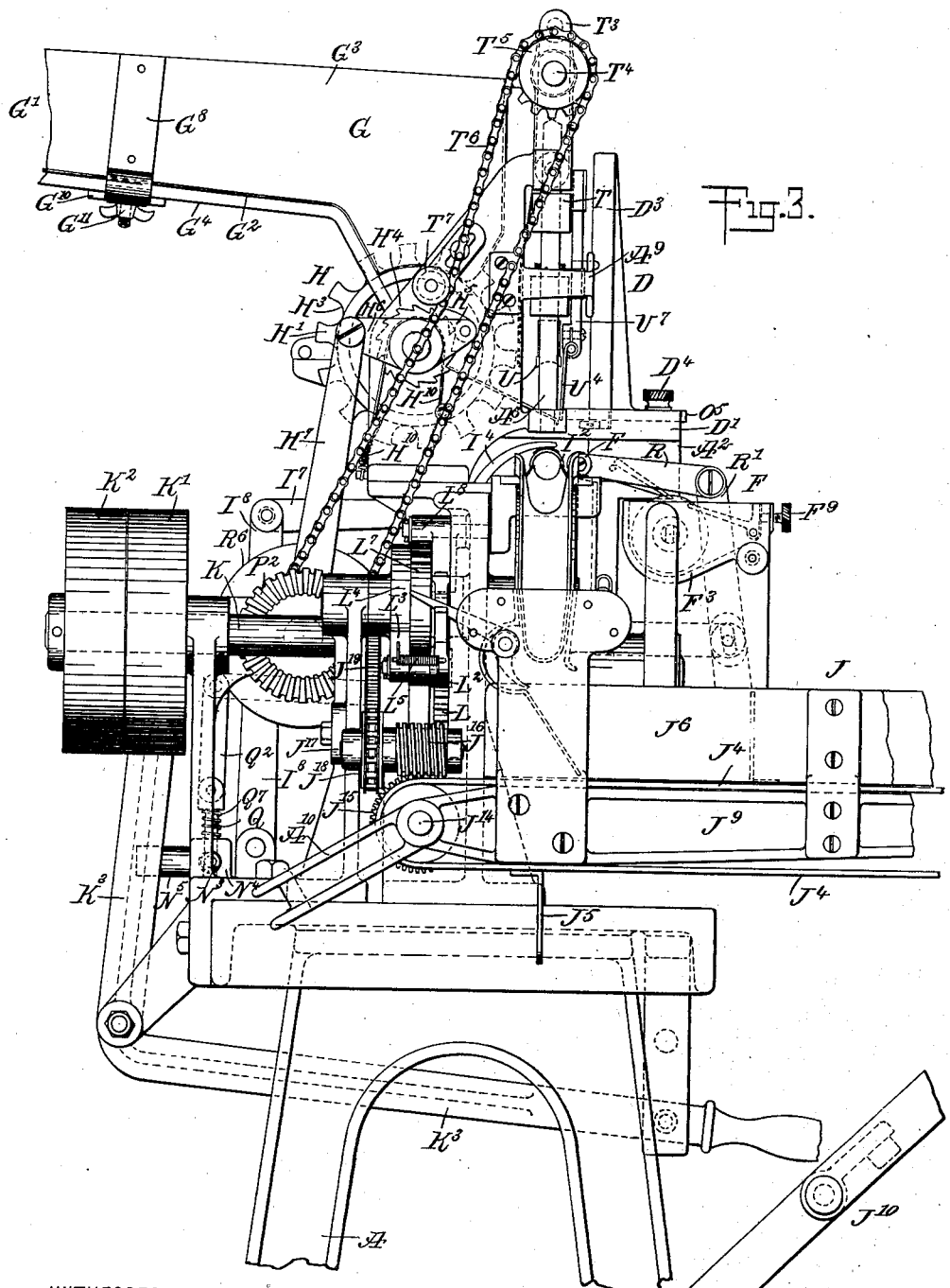
Figure 4:
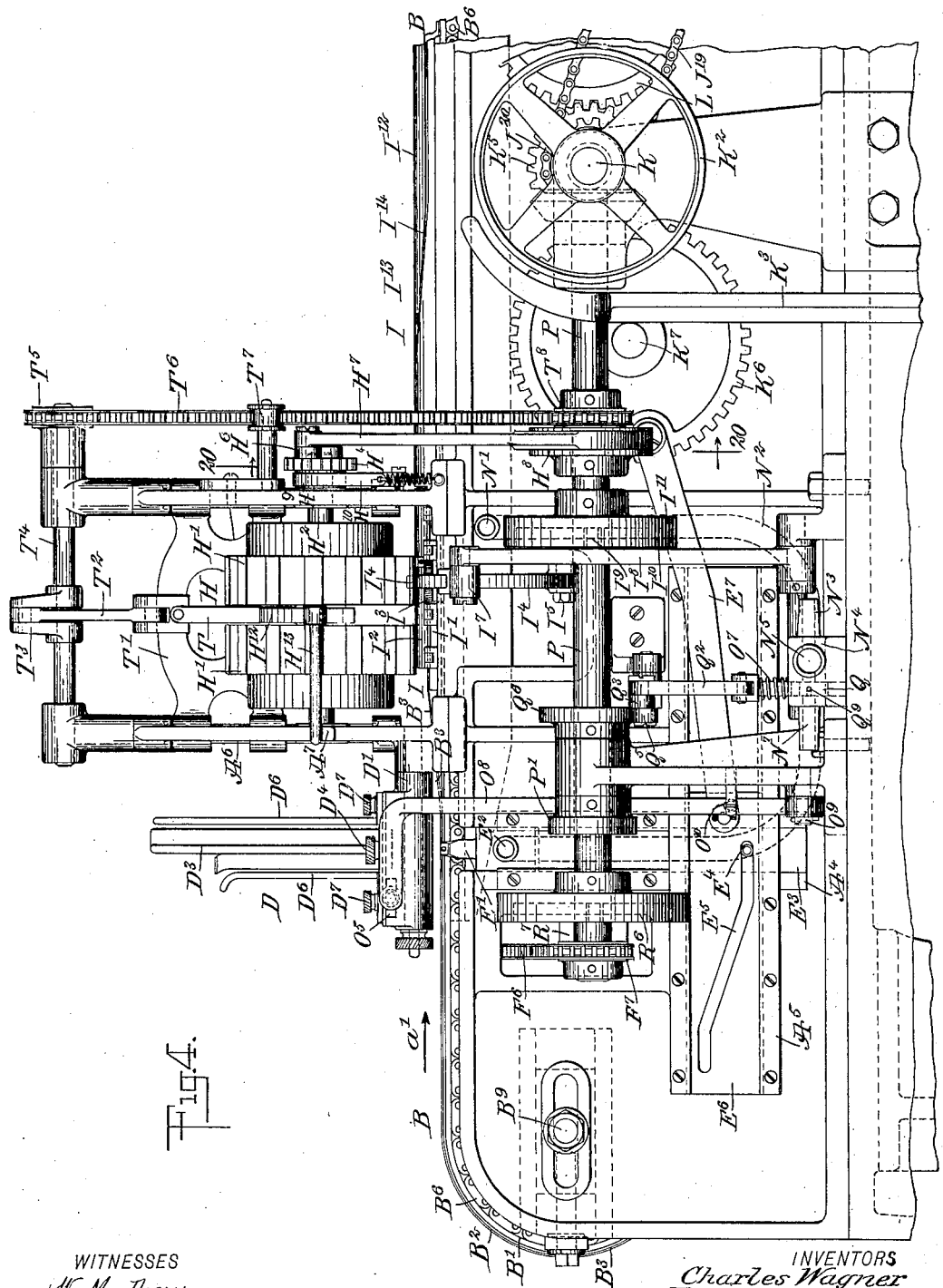
Figure 5:
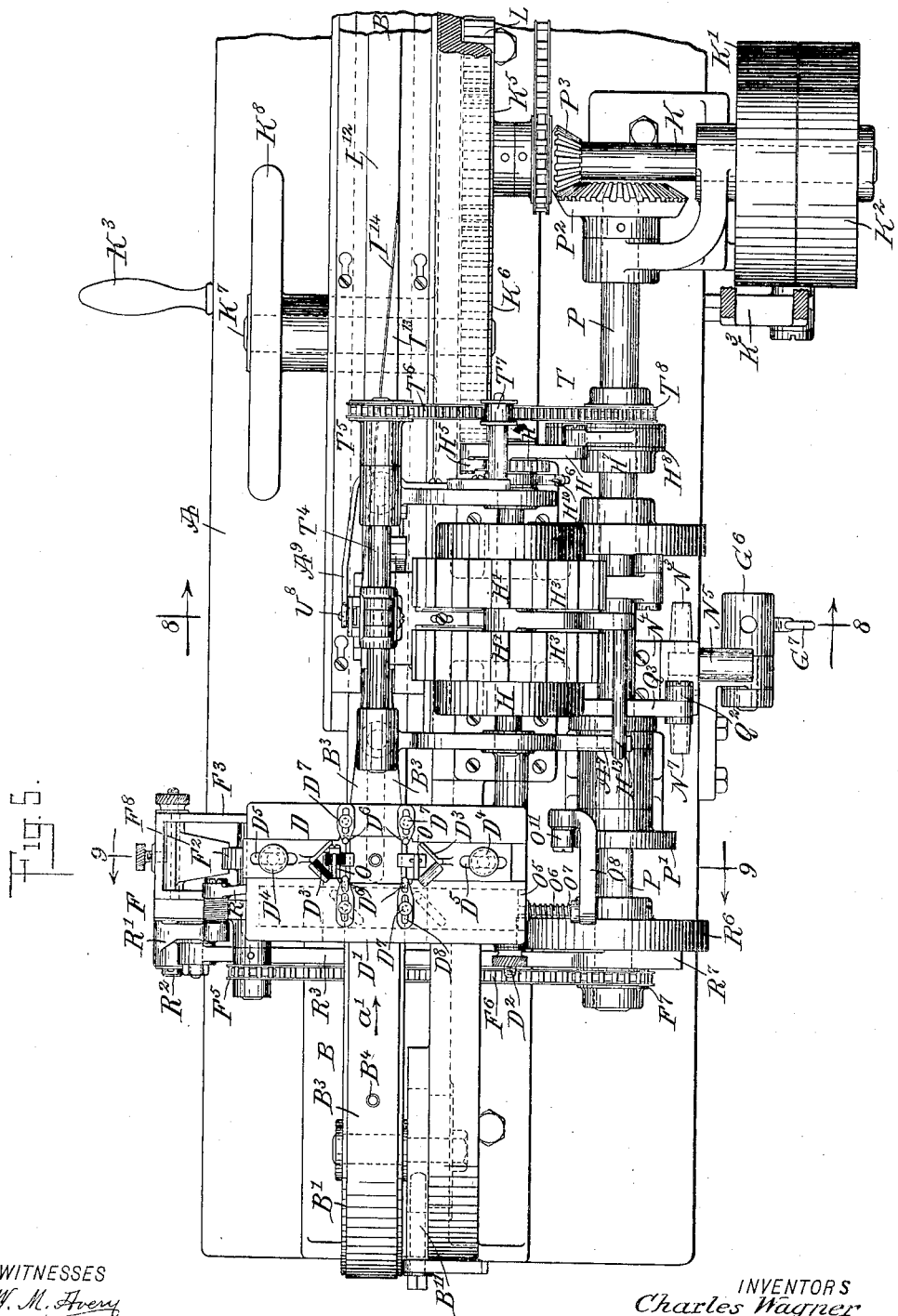
Figure 6:
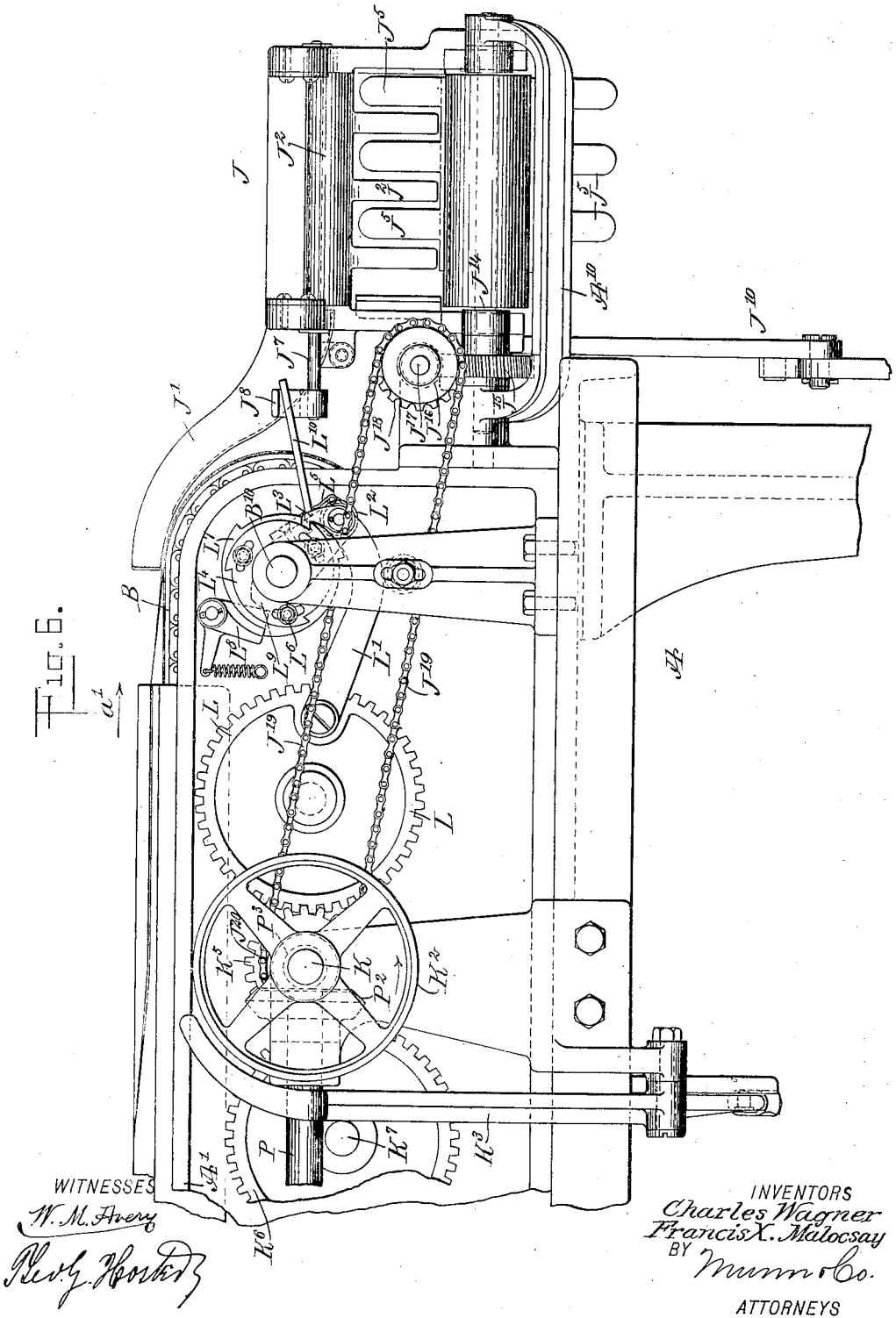
Figure 7:
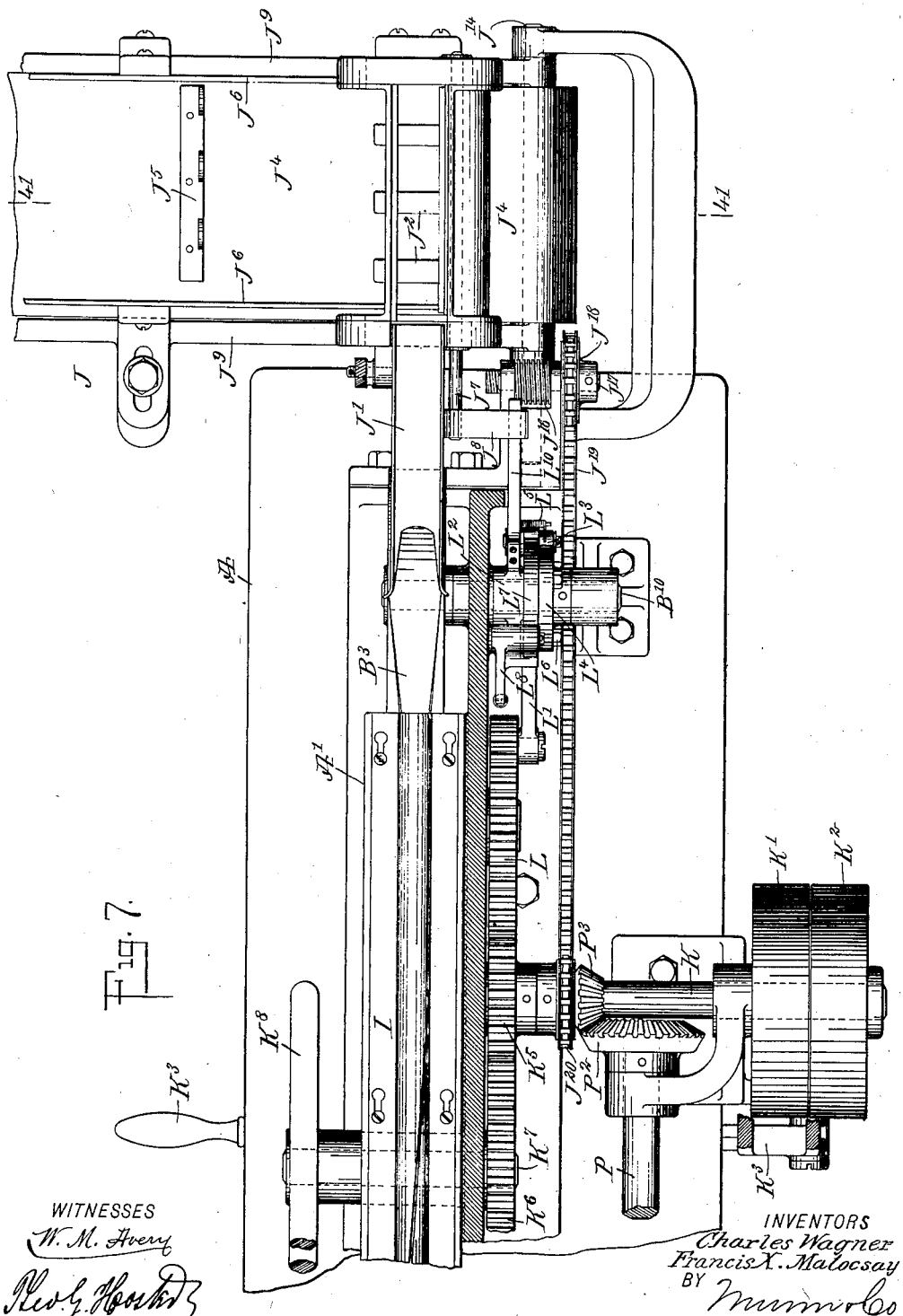
Figure 8:
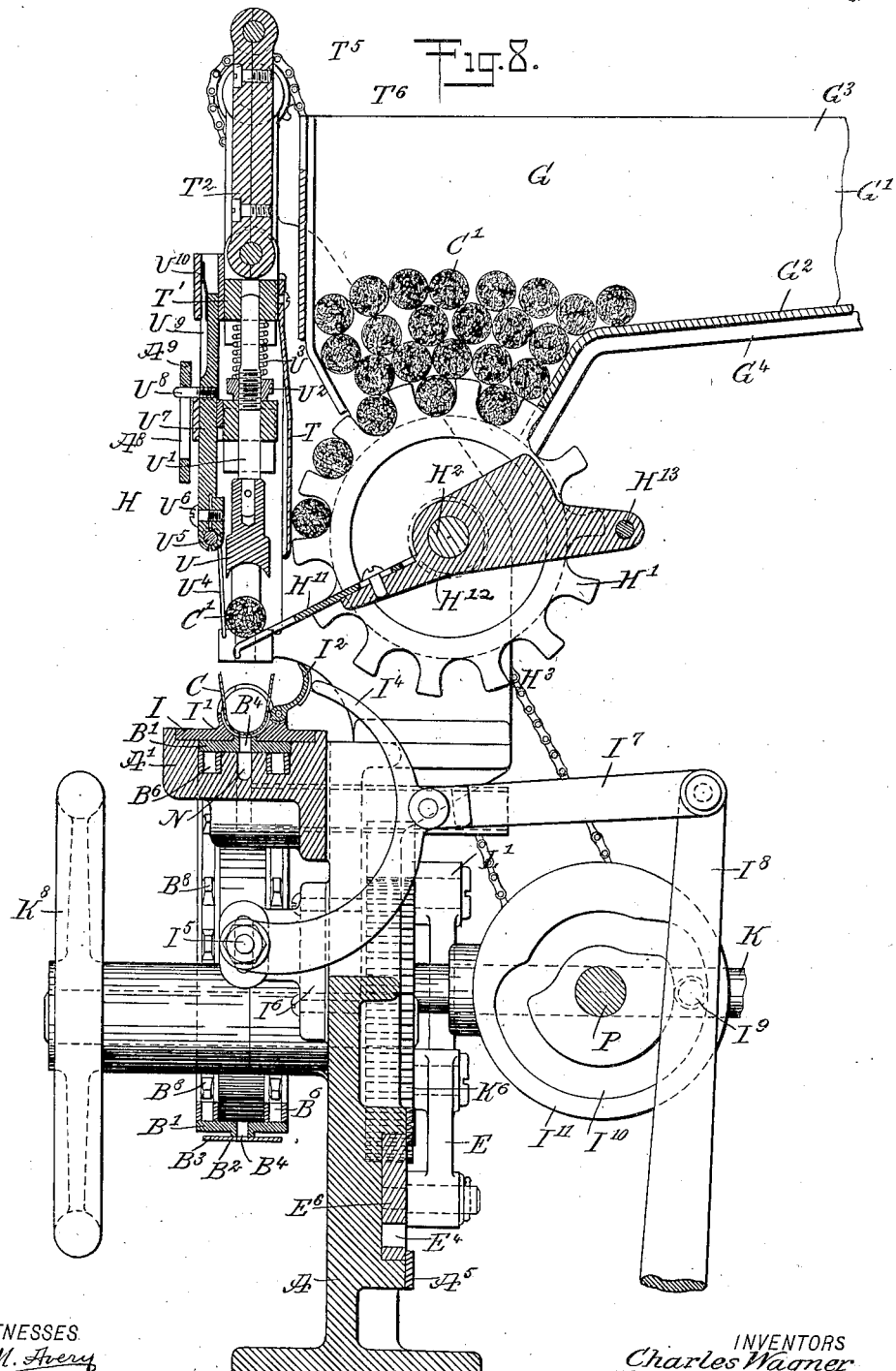

Figure 1 is a reduced front side elevation of the improved machine; Fig. 2 is an end elevation of the feed end of the machine; Fig. 3 is a like view of the delivery end of the machine; Fig. 4 is a rear side elevation of the feed end of the machine, the hopper for containing the cigars or other articles being removed; Fig. 5 is a plan view of the same; Fig. 6 is a rear side elevation of the delivery end of the machine; Fig. 7 is a plan view of the same; Fig. 8 is an enlarged cross section of the machine on the line 8—8 of Fig. 5, and showing more particularly the feeding of a cigar or other article to the partly curved open band or label; Fig. 9 is a similar view of the machine on the line 9—9 of Fig. 5, and showing more particularly the band or label feed and the pasting device; Fig. 10 is a similar view of the same, showing the parts in a different position; Fig. 11 is a plan view of the paste box, part being shown in section; Fig. 12 is a plan view, partly in section, of the guide for the paste applying roller; Fig. 13 is an elevation of the same; Fig. 14 is an enlarged plan view of the holder for the bands or labels; Fig. 15 is a like view of the same, parts being in a different position and one of the guide plates being removed; Fig. 16 is a cross section of the same on the line 16—16 of Fig. 14; Fig. 17 is an enlarged sectional side elevation of the chute for the articles to be banded, the section being on the line 17—17 of Fig. 2; Fig. 18 is a cross section of the same on the line 18—18 of Fig. 17; Fig. 19 is an enlarged plan view of the feed wheel for the articles to be banded; Fig. 20 is an enlarged cross section of the mechanism for imparting an intermittent turning motion to the feed wheel for the articles to be banded, the section being on the line 20—20 of Fig. 4; Fig. 21 is an enlarged plan view of the endless carrier and the suction device for holding the bands or labels on the endless carrier; Fig. 22 is a longitudinal sectional elevation of the same; Fig. 23 is an enlarged plan view of the band-wrapping and closing device; Fig. 24 is a cross section of the same on the line 24—24 of Fig. 23; Fig. 25 is a like view of the same on the line 25—25 of Fig. 23; Fig. 26 is a similar view of the same on the line 26—26 of Fig. 23; Fig. 27 is a like view of the same on the line 27—27 of Fig. 23; Fig. 28 is a plan view of part of the endless carrier; Fig. 29 is a side elevation of the same; Fig. 30 is a cross section of the same on the line 30—30 of Fig. 28; Fig. 31 is a like view of the same on the line 31—31 of Fig. 28; Fig. 32 is a plan view of a modified form of the endless carrier; Fig. 33 is a side elevation of the same; Fig. 34 is an enlarged front elevation of the adjustable pivot for the lever employed for closing the folding jaw; Fig. 35 is a cross section of the same on the line 35—35 of Fig. 34; Fig. 36 is a sectional side elevation of the valve mechanism for controlling the intermittent suction of the band or label feed; Fig. 37 is a like view of the same showing the parts in a different position; Fig. 38 is a transverse section of the same; Figs. 39 and 40 are front and side elevations of the valves for the suction device; Fig. 41 is a transverse section of the delivery device for the banded or labeled articles, the section being on the line 41—41 of Fig. 7; Fig. 42 is a sectional side elevation of the same on the line 42—42 of Fig. 41; Fig. 43 is an end elevation of the discharge end of the endless carrier for the said delivery device; Fig. 44 is an enlarged front elevation of the article feed device and the band or label closing device; Fig. 45 is a transverse section of the same on the line 45—45 of Fig. 44; Fig. 46 is a like view of the same, showing the parts in a different position; Fig. 47 is a sectional plan view of part of the same on the line 47—47 of Fig. 44; Fig. 48 is a like view of another part of the same on the line 48—48 of Fig. 44; Fig. 49 is an enlarged plan view of part of a modified form of the band-folding and wrapping device; Fig. 50 is a cross section of the same on the line 50—50 of Fig. 49; Fig. 51 is a like view of the same showing the parts in a different position; Fig. 52 is an enlarged cross section of the same; Fig. 53 is a like view of the same, showing the parts in a different position; Fig. 54 is a side elevation of the connection between the swing lever and the link for the final band-closing jaw; Fig. 55 is a side elevation of the final closing jaw; Fig. 56 is an edge view of the same; Fig. 57 is a side elevation of the spring-pressed foot for the final closing jaw; Fig. 58 is an edge view of the same; Fig. 59 is a side elevation of another modified form of the band or label folding and wrapping device; Fig. 60 is a plan view of the same, the machine frame being shown in section; Fig. 61 is a cross section of the same on the line 61—61 of Fig. 59; Fig. 62 is a cross section of another modified form of the band or label closing and wrapping device; Figs. 63 and 64 are like views of the same showing the parts in different positions; Fig. 65 is a plan view of the same; Fig. 66 is a face view of one of the jaws of the device shown in Figs. 62 to 64; Fig. 67 is an edge view of the same; Fig. 68 is a face view of the other closing jaw of the device shown in Figs. 62 to 64; Fig. 69 is an edge view of the same; Fig. 70 is a plan view of the band to be wrapped around a cigar by the device shown in Figs. 62 to 64, and Fig. 71 is a plan view showing the band wrapped around the cigar.

The banding or labeling machine is mounted on a suitably constructed main frame A, provided with a longitudinally extending table A', over which travels intermittently in the direction of the arrow a', the upper run of an endless carrier B, to which the bands or labels C are successively fed from an overhead band or label holder D by the use of a transferring or feeding device E, each band or label while on the said transferring or feeding device E being provided with an adhesive substance, such as paste, gum, glue or the like, applied by a gumming device F, arranged on the front side of the transferring or feeding device E, as illustrated in Figs. 1, 9 and 10. Onto the carrier B and onto each gummed label thereon is delivered a cigar or other article C' from a hopper G, by the use of an article feeding device H, the ends of the band or label then being closed around the article C' by a closing or wrapping device I, after which the banded or labeled article is carried by the carrier B to a delivery device J, for carrying the banded or labeled articles to one side of the machine. The several devices are actuated in the proper time and sequence from a main driving shaft K extending transversely and journaled on the main frame A, and the said main driving shaft K is provided at the rear side of the machine with fast and loose pulleys K', K², connected by a belt with other machinery for imparting a continuous rotary motion to the main driving shaft K to run the machine. A belt-shifting lever K³ fulcrumed on the main frame A serves to shift the belt from the fast pulley to the loose pulley and vice versa, and the said shifting lever extends to the front side of the machine, to be within convenient reach of the operator standing on this side of the machine. The shifting lever K³ is adapted to be locked in either of its two positions by a manually controlled locking lever K⁴ (see Figs. 1 and 2).

The endless carrier B (see Figs. 28 to 33) consists essentially of an endless belt B', preferably made of leather or a like material, and provided at the middle of its outer face with a longitudinally extending ridge or raised portion B², to which is secured the middle portion of a tape B³, preferably of leather or canvas, and having its sides free to turn up into a trough-like shape and to cause the band or label C to assume a like shape and to properly accommodate the article C', as hereinafter more fully described. The carrier B is provided at its middle with spaced suction ports B⁴, preferably formed by eyelets extending through the belt B', the ridge B², and the tape B³, the said suction ports B⁴ being spaced apart a distance corresponding to the travel given to the carrier B after a period of rest. When it is desired to draw a band or a label very tight around the article C', the tape B³ is preferably provided at the top with a transversely extending raised portion B⁵ at the corresponding port B⁴, as plainly illustrated in Figs. 32 and 33. The under face of the belt B' is fastened to sprocket chains B⁶ passing over the sprocket wheels B⁷ and B⁸, secured on shafts B⁹ and B¹⁰, of which the shaft B¹⁰ is journaled in stationary bearings at the delivery end of the machine, while the shaft B⁹ is journaled in longitudinally adjustable bearings B¹¹, to permit of giving the desired tension to the endless carrier B.

In order to impart an intermittent traveling motion to the carrier B from the main driving shaft K, the following device is provided, special reference being had to Figs. 6 and 7. On the driving shaft K is secured a gear wheel K⁵ in mesh with a crank gear wheel L mounted to turn on the main frame A and connected by a link L' with a swing arm L² mounted to swing loosely on the shaft B¹⁰ above referred to. On the swing arm L² is fulcrumed a pawl L³ engaging a ratchet wheel L⁴ and held in contact therewith by a spring L⁵, the said ratchet wheel L⁴ being adjustably secured by bolts $L^6$ to another ratchet wheel $L^7$ fastened on the shaft $B^{10}$. The ratchet wheel $L^7$ is engaged by a spring-pressed dog $L^8$, to lock the shaft $B^{10}$ and consequently the carrier B against over throw movement, the said dog $L^8$ being moved out of engagement with the ratchet wheel $L^7$ by the cam end $L^9$ of the swing arm $L^2$ when the latter receives a swinging motion in a forward direction from the crank wheel L and immediately previous to the pawl $L^3$ carrying the ratchet wheel $L^4$ around. Now during the backward swinging motion of the swing arm $L^2$ the dog $L^8$ is held out of engagement with the ratchet wheel $L^7$, while the pawl $L^3$ turns the ratchet wheels $L^4$, $L^7$ and consequently the shaft $B^{10}$ and sprocket wheel $B^8$, to impart a traveling motion to the carrier B in the direction of the arrow $a'$. As soon as the link $L'$ is on the return stroke the cam end $L^9$ of the swing arm $L^2$ releases the dog $L^8$, so that the latter moves in engagement with the ratchet wheel $L^7$, to hold the latter against over throw movement. During the return swinging movement of the swing arm $L^2$, the pawl $L^3$ glides over the teeth of the ratchet wheel $L^4$ without turning the same. Thus on each full revolution given to the crank gear wheel L an intermittent traveling motion is given to the carrier B.

The upper run of the endless carrier B in traveling over the table $A'$ passes with the middle portion of the underside of the belt $B'$ over the open top of a suction chamber N (see Figs. 9, 10, 21, 22, 23 and 24) formed lengthwise in the table $A'$, and provided with a nipple $N'$ connected by a hose $N^2$ with a nipple $N^3$ on a main suction chamber $N^4$, having a nipple $N^5$ connected by a hose with a suction fan, suction bellows or other suction device, of any approved construction, for producing a suction in the chambers $N^4$ and N. The suction chamber N is of such length as to register with two of the suction ports $B^4$ at the same time (see Fig. 22), the carrier B being at this time at a standstill. The rearmost registering suction port $B^4$ is then below the pile of bands or labels C, so that the transferring device E delivers a band or label C from a pile of bands to the tape $B^3$ at the said rearmost registering port $B^4$, the band or label C extending transversely on top of the tape $B^3$, as plainly shown in Fig. 9, so that the suction in the chamber N holds the band or label firmly to the tape $B^3$ during the time the carrier B moves forward to the next position, to bring the band or label under the article feed device H. It is understood that the suction port $B^4$ with the label on top now occupies the second or forward position over the suction chamber N, and the band or label is still held to the tape $B^3$ during the time the cigar or other article is placed in position on the band C and tape $B^3$, and as long as the suction port $B^4$ registers with the suction chamber N.

The band or label holder D is arranged as follows, special reference being had to Figs. 4, 5, 9, 10, 14, 15 and 16: The base $D'$ of the holder D is in the form of a rectangular frame hinged at $D^2$ to the main frame A, at the rear side thereof and extending transversely over the top of the carrier B, the free end of the base $D'$ resting on the front of the frame A at $A^2$. By the arrangement described the band or label holder D can be readily swung over to the rear side of the main frame, to obtain access to the transferring device E whenever it is desired to do so. On the base $D'$ are arranged the oppositely disposed standards $D^3$, made V-shape when viewed in plan, and held transversely adjustable by clamping bolts $D^4$ extending through elongated slots $D^5$ formed in the bases of the said standards, the bolts screwing into the holder base $D'$ (see Figs. 9 and 10), to allow of adjusting the standards $D^3$ toward and from each other according to the length of the bands or labels, to allow of bringing the pile of bands or labels in proper position above the carrier B. It is understood that for making the adjustment of the standards $D^3$, the bolts $D^4$ are loosened, and then the standards are adjusted, after which the bolts $D^4$ are screwed up to secure the standards $D^3$ in the adjusted position. The sides of the bands or labels are engaged by two sets of vertical rods $D^6$ held longitudinally adjustable by bolts $D^7$ extending through elongated slots $D^8$ formed in the bases of the rods $D^6$, the said bolts $D^7$ screwing into the holder base $D'$, and when loosened allow the adjustment of the rods $D^6$, to bring the same into the desired position relative to the width and shape of the bands or labels C. Thus by the use of the rods $D^6$ the pile of bands or labels is held against longitudinal displacement and at the same time the pile of bands or labels can be brought into proper position relative to the suction port $B^4$ directly below the middle of the bands or labels C. By the use of the transversely adjustable standards $D^3$ and the longitudinally adjustable rods $D^6$ labels or bands of different sizes and different shapes can be readily accommodated, and at the same time the pile of labels can be accurately brought into central position above the suction port $B^4$ at rest at the time below the pile of labels. To permit of conveniently placing the bands or labels C in position in the holder D, the upper ends of the rods $D^6$ on one side of the holder D are curved outwardly, and the adjacent members of the standards $D^3$ are similarly curved, and the curved ends are somewhat lower than the straight ends of the other rods $D^6$ and the other members of the standards $D^3$. The pile of bands or labels is normally supported by a pair of longitudinally extending supporting rods O projecting from plates O' mounted to slide longitudinally in guideways $D^9$ arranged on the base D', the said plates O' having rollers $O^3$ extending into diagonal slots $O^4$ formed in a slide $O^5$ mounted to slide transversely in guideways $D^{10}$ arranged on the base $D^2$. The rear reduced end $O^6$ of the slide $O^5$ is pressed by a spring $O^7$, to hold the slide $O^5$ normally in a rearmost position and the supports O under the pile of bands or labels C to support the latter. When the slide $O^5$ is pressed forward against the tension of the spring $O^7$ then the rollers $O^3$ engaging the diagonal slots $O^4$ in the slide $O^5$ are shifted to the right, to cause the plates O' and the arms O to slide in a like direction, that is, the supporting arms O move out from under the pile of bands or labels C and at the time the transferring device E is ready to support the pile of bands or labels, as hereinafter more fully described. Now in order to impart the transverse movement to the slide $O^5$ against the tension of the spring $O^7$, the terminal of the reduced end $O^6$ of the slide $O^5$ is engaged by the free end of a lever $O^8$ fulcrumed at $O^9$ on the main frame A (see Fig. 2), the said lever being engaged by a pull spring $O^{10}$, and the said lever being provided with a friction roller $O^{11}$ in contact with the peripheral face of a cam P' secured on the cam shaft P extending longitudinally and journaled in suitable bearings on the rear side of the main frame A. The cam shaft P is continually driven from the main shaft K, and for this purpose the cam shaft P is provided with a bevel gear wheel $P^2$ in mesh with a bevel pinion $P^3$ secured on the main shaft K, as plainly indicated in Figs. 5 and 7. Now when the machine is running, the main shaft K imparts a rotary motion to the cam shaft P, which by its cam P' imparts a transverse swinging motion to the lever $O^8$, to move the slide $O^5$ against the tension of the spring $O^7$ and toward the front side of the machine, so that the supporting arms O are withdrawn from underneath the pile of bands or labels at the time the transferring device E supports the pile of bands or labels C.

The band or label transferring device E is arranged as follows, special reference being had to Figs. 4, 9, 10, 36, 37, 38, 39 and 40. A U-shaped suction chamber E' straddles the table A' and the carrier B, and is intermittently moved up and down, as hereinafter more fully described, and one side of the said suction chamber E' is provided with a nipple $E^2$ connected by a flexible tube or hose $N^6$ with a nipple $N^7$ formed on the main suction chamber $N^4$ above referred to. A channel $N^8$ connects the nipple $N^7$ with the main suction chamber $N^4$, and the said channel $N^8$ is controlled by a slide valve Q (see Figs. 36 to 40), for producing an intermittent suction in the suction chamber E'. The slide valve Q is provided with a port Q' adapted to connect the nipple $N^7$ with the channel $N^8$ at the time the slide valve Q is in a lowermost position, thus causing a suction in the chamber E', and when the valve Q is raised to the position shown in Figs. 37 and 38, then the port Q' moves out of register with the nipple $N^7$ and the channel $N^8$, to cut off the suction from the chamber E'. The slide valve Q is pivotally connected by a link $Q^2$ with a lever $Q^3$ fulcrumed at $Q^4$ on the main frame A, and on the said lever $Q^3$ is journaled a friction roller $Q^5$ in peripheral contact with a cam $Q^6$ secured on the cam shaft P, the friction roller $Q^5$ being held in contact with the said cam $Q^6$ by the action of a spring $Q^7$ pressing the valve Q. The cam $Q^6$ is shaped in such a manner that the valve Q cuts off the suction from the chamber E' immediately after the said chamber E' has delivered a band to the tape $B^3$ of the carrier B, and the suction remains cut off until the chamber E' is in engagement with the lowermost band or label C of the pile of bands or labels held in the holder D, as hereinafter more fully described. The valve Q is also provided with a leak port $Q^8$ adapted to connect the nipple $N^7$ with a port $Q^9$ leading to the outside, so as to permit air to pass into the nipple $N^7$ and the suction chamber E' for breaking the vacuum in the suction chamber E' and for quickly releasing the label on the suction chamber E', as hereinafter more fully explained. The suction chamber E' is secured at the rear side to a slide $E^3$ mounted to slide intermittently up and down in suitable guideways $A^4$ arranged on the rear side of the main frame A. The slide $E^3$ is provided with a friction roller $E^4$ extending into a cam slot $E^5$ formed in a slide $E^6$ mounted to slide longitudinally in guideways $A^5$ arranged on the rear side of the main frame A, and the said slide $E^6$ is connected by a pitman $E^7$ with a crank gear wheel $K^6$ in mesh with the gear wheel $K^5$ held on the main shaft K. Thus when the machine is running the main shaft K by the gear wheel $K^5$ rotates the gear wheel $K^6$, which by the pitman $E^7$ imparts a reciprocating motion to the slide $E^6$, which in turn imparts an intermittent up and down motion to the slide $E^3$ by the cam slot $E^5$ engaging the friction roller $E^4$. By reference to Fig. 4, it will be seen that the ends of the cam slot $E^5$ are parallel with the direction of the travel of the slide $E^6$ and consequently the slide $E^3$, and the suction chamber E' attached thereto remain stationary during the beginning portion and the end portion of each stroke of the slide $E^6$. The middle portion of the cam slot $E^5$ has a rise to such an extent as to raise the suction chamber E' from the position shown in Fig. 9 to that illustrated in Fig. 10 and during the time the slide $E^6$ is traveling in the direction of the arrow a', and when the slide is on the return stroke the suction chamber E′ returns from the position shown in Fig. 10 to that illustrated in Fig. 9.

The upper or suction ends of the two side arms of the suction chamber E′ are beveled downwardly and outwardly, as plainly shown in Figs. 9 and 10, and the said ends are provided with supporting plates $E^8$ adapted to engage with their inner ends the under side of the lowermost band or label of the pile of bands or labels C held in the holder D, so that the pile of bands or labels C is supported by the suction chamber E′ for the time being, to allow of withdrawing the supporting arms O in longitudinal alinement with the openings in the upper ends of the side arms of the suction chamber E′. Now when the chamber E′ reaches the uppermost position shown in Fig. 10 and the supporting arms O have been withdrawn from underneath the lowermost band or label C then the valve Q moves into an open position so as to cause a suction in the chamber E′, whereby the ends of the lowermost band or label are sucked down onto the beveled ends of the suction chamber E′, as indicated in Fig. 10, and when this takes place a space is formed between the ends of the lowermost band or label and the ends of the following band or label next above, so that the supporting arms O can now return to a supporting position for supporting the pile of bands or labels C, except the lowermost one now adhering to the suction chamber E′. The latter now descends to carry the band or label held thereon down onto the tape $B^3$, as illustrated in Fig. 9, the middle of the band or label being directly over the suction port $B^4$ in communication with the suction chamber N. When this takes place, the valve Q moves into a closed position, thus cutting off the suction from the chamber E′ for the latter to release the ends of the band or label C now held to the tape $B^3$ by the suction from within the chamber N. It is understood that when the valve Q moves into a closed position, such as shown in Figs. 37 and 38, air can pass by way of the leak ports $Q^9$, $Q^8$ into the suction chamber E′, to break the vacuum therein and thus loosen the ends of the band or label C from the ends of the suction chamber E′. The carrier B now travels forward in the direction of the arrow a′, to bring the label adhering to the tape $B^3$ in position under the article feed H, it being understood that the band or label extends transversely across the tape $B^3$ and is held thereto by the suction in the chamber N.

An adhesive substance, such as paste, gum or the like, is applied to the upper face of the band or label C a distance from the front end thereof, by the use of the pasting or gumming device F at the time the band or label C is in position on the suction chamber E′ and the latter is in a lowermost position and previous to a traveling motion being given to the carrier B (see Fig. 9). The pasting or gumming device F is arranged as follows, special references being had to Figs. 1, 2, 3, 5, 9, 10, 11 and 12. A roller F′ is adapted to travel bodily in a transverse direction to carry the adhesive substance to the band or label C from a fountain roller $F^2$ mounted to turn in a fountain $F^3$ containing the adhesive substance and attached to the main frame A. On the outer end of a shaft $F^4$ of the fountain roller $F^2$ is secured a sprocket wheel $F^5$ connected by a sprocket chain $F^6$ with a sprocket wheel $F^7$ attached to the cam shaft P, so that when the machine is running a continuous rotary motion is given to the fountain roller $F^2$. A scraper $F^8$ engages the peripheral face of the fountain roller $F^2$, to scrape off the surplus adhesive substance from the peripheral face of the fountain roller $F^2$ previous to the said peripheral face coming in contact with the applying roller F′. The scraper $F^8$ can be adjusted by a screw $F^9$, as indicated in Figs. 9 and 10. The applying roller F′ is journaled on the free end of an arm R fulcrumed at the upper end of the lever R′ pivoted at its lower end at $R^2$ to the main frame A, and the said lever R′ is pivotally connected with a transversely extending link $R^3$ provided with a friction roller $R^4$ traveling in a cam groove $R^5$ formed on one face of a cam $R^6$ secured on the cam shaft P. The link $R^3$ has its end terminating in a fork $R^7$ straddling the cam shaft P, so as to properly support the free end of the link $R^3$. Now when the machine is running and the cam shaft P is rotating then the cam $R^6$ imparts a transverse movement to the link $R^3$, whereby a swinging motion is given to the lever R′, so that the arm R moves the applying roller F′ from the fountain roller $F^2$ (see Fig. 10), over to and in contact with the top of the band or label C a distance from the end thereof, as indicated in Fig. 9. On the arm R is journaled a friction roller $R^8$ adapted to travel up an incline S at the time the roller F′ moves from the fountain roller $F^2$ toward the band to be supplied with adhesive substance. The incline S is provided at its upper end with a pivot S′ mounted to turn in a bearing $S^2$ held on the main frame A, the pivot being pressed on by a spring $S^3$, so as to normally hold the incline S in a lowermost position, but to allow the incline S to swing upward on the return movement of the applying roller F′. Now when the roller $R^8$ travels up the incline S it finally reaches the highest point thereof and then drops down the same for the roller F′ to drop onto the band or label C held in place on the suction chamber E′, as illustrated in Fig. 9. Now the applying roller F′ by moving in contact with the band or label deposits the adhesive substance on the band or label a distance from the adjacent end thereof. The applying roller F′ on its return travel passes on to the upper end $S^5$ of a plate $S^6$ held vertically adjustable by a screw $S^7$ on the main frame A, so that during the return movement of the roller $F'$ the latter is immediately lifted off the band or label C, and the friction roller $R^8$ now travels underneath the incline S and swings the same up against the tension of its spring $S^3$. The friction roller $R^8$ finally leaves the free end of the incline S, to allow the latter to drop down into its normal position at the time the applying roller $F'$ reaches the peripheral face of the fountain roller $F^2$. By making the bearing $S^2$ transversely adjustable on the main frame A, the drop-off or pivotal end of the incline S can be brought nearer to or farther from the band or label C, to cause the applying roller $F'$ to apply the adhesive substance the desired distance from the end of the band or label. It is understood that the adhesive substance is placed onto the band a distance from the end thereof, so that when the band or label is finally wrapped around the article, the adhesive substance has a chance to spread toward the end of the band without the adhesive substance, however, spreading beyond the side edges or terminal of the gummed end, and consequently neither the band nor the cigar is marred by a surplus adhesive substance.

The hopper G for containing the cigars or other articles $C'$ and the article feed device H are arranged as follows, special reference being had to Figs. 2, 3, 4, 5, 8, 17, 18, 19, 20 and 44 to 48: Into the open bottom of the hopper G (see Fig. 8) extends the tops of the double feed wheel $H'$—$H'$, secured on a longitudinally extending shaft $H^2$, journaled in suitable bearings arranged on the main frame A, and the peripheries of the two wheels $H'$—$H'$ are provided with registering recesses $H^3$, each pair of registering recesses being adapted to receive a single cigar or other article $C'$, to be carried downwardly and forwardly on intermittently rotating the feed wheels $H'$—$H'$. In order to impart this motion to the feed wheels $H'$—$H'$, the shaft $H^2$ is provided with a ratchet wheel $H^4$ (see Figs. 4, 20 and 44), engaged by a pawl $H^5$ fulcrumed on a lever $H^6$ mounted to swing loosely on the shaft $H^2$, and pivotally connected with the eccentric rod $H^7$ of an eccentric $H^8$ held on the cam shaft P. Thus when the machine is running, the cam shaft P causes the eccentric $H^8$ to impart a rocking motion to the lever $H^6$, which by the pawl $H^5$ imparts an intermittent rotating motion to the ratchet wheel $H^4$, the shaft $H^2$ and the feed wheels $H'$—$H'$. In order to prevent the feed wheels $H'$—$H'$ from being turned too far by the mechanism described, the shaft $H^2$ is provided with a friction wheel $H^9$ engaged by a spring-pressed friction band $H^{10}$, as plainly shown in the figures referred to. When a cigar or other article $C'$ carried by the feed wheels $H'$—$H'$ reaches a level corresponding to that of the shaft $H^2$ (see Fig. 8) then the article $C'$ comes in contact or abuts against the free end of a spring T secured at its upper end to a cross head $T'$, mounted to slide vertically on suitable guideways $A^6$, arranged on the main frame A. The cross head $T'$ carries a yieldingly mounted plunger U, for pressing the cigar or other article down into the open band or label C held at the time in a U-shaped position in the former $I'$ of the closing and wrapping device I. The cross head $T'$ receives a continuous up and down reciprocating motion, and for this purpose the cross head $T'$ is pivotally connected at its upper end by a pitman $T^2$ with a crank arm $T^3$ formed on a crank shaft $T^4$ journaled in suitable bearings held on the upper end of the guideways $A^6$, and on the said shaft $T^4$ is secured a sprocket wheel $T^5$ connected with a sprocket chain $T^6$ passing over a tightening pulley $T^7$ and also passing around a sprocket wheel $T^8$ (see Fig. 4) secured on the cam shaft P, so that when the machine is running the cam shaft P turns the sprocket wheel $T^8$, thus imparting a traveling motion to the sprocket chain $T^6$ which, by the sprocket wheel $T^5$, rotates the shaft $T^4$, to cause the crank arm $T^3$ and the pitman $T^2$ to impart a continuous up and down sliding motion to the cross head $T'$. The plunger U has its shank $U'$ mounted to slide vertically in bearings on the cross head $T'$, and on the said shank screws a nut $U^2$ resting on the cross head T and serving to adjust the shank $U'$ and the plunger U up or down, to bring the bottom of the plunger in proper relation to the article $C'$, that is, to adjust the plunger U relative to the varying thickness or diameter of the article to be banded. The nut $U^2$ is pressed normally to its seat by a spring $U^3$, which allows the plunger U to yield in an upward direction when pressing the cigar or other article $C'$ into the former $I'$, thus preventing injury to the cigar or other article. The plunger U operates in conjunction with the spring T and with a chute $H^{11}$ and a front guide $U^4$, of which the chute $H^{11}$ is adjustably secured on a counterbalancing swing arm $H^{12}$, mounted to turn loosely on the shaft $H^2$ and between the feed wheels $H'$—$H'$. The rear end of the arm $H^{12}$ is provided with a stop pin $H^{13}$ normally resting on a stop lug $A^7$ formed on the main frame A (see Fig. 4), to hold the chute $H^{11}$ normally in the slightly inclined position shown in Fig. 8, but to allow the chute $H^{11}$ to swing downward for the cigar or other article $C'$ rolling out of the feed wheels $H'$—$H'$ onto the chute $H^{11}$ and down the same (see Figs. 4, 8 and 46).

The guide $U^4$ above referred to extends in front of the plunger U and is in the form of two spring plates (see Fig. 44), secured at their upper ends to a shaft $U^5$, clamped by a screw U⁶ in the lower split end of a bar U⁷, mounted to slide intermittently up and down in bearings carried by the cross head T'. The bar U⁷ is provided with a forwardly extending pin U⁸ extending into a vertical elongated slot A⁸ formed in a bracket A⁹ secured to the front of the main frame A. The bar U⁷ is normally held against sliding in its bearings by a spring U¹⁰ secured to one of the bearings and extending into a groove U⁹ in the front of the bar U⁷. Now when the plunger U is in an uppermost position (see Fig. 46), then the pin U⁸ is in the upper end of the slot A⁸, and when the cross head T' moves downward then the bar U⁷ moves with the cross head T' owing to the spring U¹⁰ pressing the bar U⁷. When the pin U⁸ reaches the bottom of the slot A⁸ and the cross head T' still descends farther, then the bar U⁷ is held stationary by the bracket A⁹ while the cross head T' and the plunger U continue their downward movement. When this takes place the lower end of the guide U⁴ is at or near to the front top edge of the former I', as plainly illustrated in Fig. 45. Now when the cross head T' and with it the plunger U move upward, then the bar U⁷ travels with the cross head T' and consequently the pin U⁸ travels upward in the slot A⁸, and when the pin U⁸ reaches the top of the slot A⁸ and the cross head T' continues its upward movement, then the bar U⁷ is held stationary for the time being, to allow the lower end of the plunger U to rise sufficiently above the chute H¹¹ for the cigar or other article in the feed wheels H'—H' to roll out of the corresponding recess H³ thereof, down the chute H¹¹ until it finally abuts against the guide U⁴, as illustrated in Fig. 8. When the cross head T' and with it the plunger U now descend, the plunger finally moves in contact with the cigar or other article resting on the chute H¹¹ and abutting against the guide U⁴, and at this time the bar U⁷ and consequently the guide U⁴ moves downward with the cross head T' and plunger U, to push the cigar or other article downward into the open band or label C, as illustrated in Fig. 45. During this downward movement of the plunger U the chute H¹¹ is caused to swing downward to the position shown in Fig. 45 by the action of the plunger U moving downward with the cross head T'. As the forward end of the chute H¹¹ is in the form of a fork it is evident that it readily passes the rear upwardly extending end of the band or label C, as shown in Fig. 45. When the cross head T' and with it the plunger U, the spring T and guide U⁴ move upward, then the counterbalancing arm H¹² causes the chute H¹¹ to swing upward to its normal position, that is, until the stop pin H¹³ rests on the lug A⁷.

The hopper G and its inlet chute G' are made adjustable in width, to accommodate longer or shorter cigars or other articles C' placed into the chute G' by hand or by a mechanical filling device, not shown. The hopper G and its chute G' consists of a bottom G² and sides G³ (see Figs. 2, 3, 17 and 18), and the bottom G² rests on brackets G⁴ terminating in eyes, through which passes loosely the shaft H², to allow of swinging the hopper G and its chute G' into the desired angular position for the cigars or other articles C' to roll easily down the chute G' and into the hopper G, and the notches H³ of the feed wheels H'—H'. A brace G⁵ (see Fig. 2) is pivotally connected with the outer end of the bottom G², for supporting the chute G' in the desired inclined position, and the lower end of the brace G⁵ slidingly engages a swivel G⁶ mounted on the main frame A. A set screw G⁷ screwing in the swivel G⁶ against the brace G⁵ serves to hold the latter in the adjusted position. The sides G³ are provided with brackets G⁸ (see Figs. 2, 3, 17 and 18), having U-shaped bases G⁹, the bottom members of which are adjustably secured to a plate G¹⁰ by the use of clamping screws G¹¹ held on the plate G¹⁰ and extending through elongated slots G¹² formed in the said bottom members of the bases G⁹. The plate G¹⁰ is adjustably secured to the cross bar of the supporting brackets G⁴ by a clamping screw G¹³ extending through an elongated slot G¹⁴ on the plate G¹⁰. By reference to Figs. 2, 3 and 19, it will be seen that the sides G³ of the hopper G fit over the top of the hubs H¹⁴ of the feed wheels H'—H'. Now on loosening the clamping screws G¹¹ and G¹³, the sides G³ can be readily adjusted toward or from each other according to the length of the cigars or other articles C to be banded and placed into the chute G', as shown in Fig. 17, that is, transverse to the chute and lengthwise relative to the direction in which the carrier B travels.

The wrapping of the band or label around the article C by the wrapping and closing device I is arranged as follows, special reference being had to Figs. 1, 4, 5, 8, 23, 24, 25, 26, 27, 44, 45 and 46: The former I' above referred to is made in two parts, removably secured to the top of the table A', the under side of the two parts being spaced apart, to form a longitudinally extending slot for the passage of the ridge or raised portion B² of the endless carrier B. The portion of the former I' immediately below the article feed device H is trough-like while the forward portion is tubular, and into the trough-like portion of the former I' pass the free sides of the tape B³, to assume the trough-like form of the said portion. The rear end of the trough-like portion of the former I' is spaced from the transferring device E, and hence that portion of the tape B³ extending from the transferring device E to the rear end of the trough-like portion gradually assumes the trough-like form, as plainly indicated in Figs. 1, 4, 5 and 44. Now as the gummed band or label C travels with the tape $B^3$ from the transferring device E to and into the former I', it is evident that it assumes a trough-like shape, especially as the band or label is firmly held at its middle to the tape $B^3$ by the suction of the chamber N exerted against the under side of the band or label C by way of the suction port $B^4$ covered by the band or label C (see Figs. 8 and 45). On the rear side of the trough-like portion of the former I' is hinged a closing jaw $I^2$ normally held in an open position by a spring $I^3$ and adapted to be closed by a lever $I^4$ fulcrumed on a pivot $I^5$ held vertically adjustable on a bracket $I^6$ secured to the main frame A (see Figs. 8, 35 and 36). The lever $I^4$ is pivotally connected by a link $I^7$ with the upper end of a lever $I^8$ fulcrumed at its lower end on the main frame A, and provided with a friction roller $I^9$ engaging a cam groove $I^{10}$ in a cam $I^{11}$ attached to the cam shaft P (see Fig. 8). Now when the machine is running, the cam shaft P by the cam $I^{11}$ imparts an intermittent swinging motion to the lever $I^8$, so that the link $I^7$ imparts a swinging motion to the closing lever $I^4$, for the latter to swing the jaw $I^2$ into a closed position against the tension of its spring $I^3$ and immediately after the cigar or other article C' has been passed into the open trough-like band C by the article feed device H, as above described and shown in Fig. 45. Now when the jaw $I^2$ swings into a closed position, it engages the free non-gummed rear end of the band or label C and thus folds this end of the band or label C onto the cigar or other article C' held in the band and the tape $B^3$.

The front or gummed end of the band or label C is folded onto the top of the non-gummed and already folded other end of the band or label by the following arrangement: The two parts constituting the former I' terminate at the forward end of the trough-like portion in integral members $I^{12}$, $I^{13}$, forming a tubular portion having the slot at the bottom for the passage of the ridge or rest portion $B^2$, and having a narrow slot $I^{14}$ for the passage of the front or gummed end of the band or label C. This narrow slot $I^{14}$ is of spiral shape and begins at the top edge of the front member of the trough-like portion of the former I', and then the slot makes about a half turn over to the rear side (see Figs. 23, 24, 25, 26 and 27). Now after the jaw $I^2$ has been swung over to fold the non-gummed end of the band or label C, as above mentioned and shown in Figs. 23, 24 and 46, then the carrier B travels forward while the jaw $I^2$ remains in a closed position, so that the cigar or like article C' as well as the band C partly wrapped around the cigar or other article C' is carried along and in doing so the front gummed end of the band or label C passes into the spiral slot $I^{14}$ and is gradually folded over the other end of the band or label, and is attached thereto by the adhesive substance previously deposited onto the front end of the band or label C by the roller F', as previously explained. It is understood that as the cigar or like article C' and the band C travel from the trough-like portion having the closed jaw $I^2$, and through the tubular portion, the gummed end of the band or label is gradually drawn inward through the slot $I^{14}$ and folded upon the other non-gummed end of the band or label C, to complete the wrapping operation. The forward portion of the slot $I^{14}$ extends straight to the forward end of the tubular portion at the rear side thereof, and this tubular portion is of sufficient length to insure sufficient drying of the adhesive substance, to securely hold the ends of the band or label C united, at the time the cigar or other article emerges from the forward end of the wrapping and closing device I, as indicated to the left of Fig. 23. It is understood that during the time the tape $B^3$ passes through the trough-like and tubular portion of the device I it remains in trough-like shape, and begins to straighten out again into flap shape after leaving the forward end of the tubular portion and previous to reaching the sprocket wheel $B^8$ (see Fig. 1).

The delivery device J is arranged as follows, special reference being had to Figs. 1, 3, 6, 7, 41, 42 and 43: The banded or labeled cigar or other article, after leaving the exit end of the wrapping device I, is carried by the carrier B into a downwardly inclined chute J' extending with its upper entrance end onto the top of the now flat tape $B^3$, so that the cigar with the pointed end forward readily passes into the chute J' and slides down the same by its own weight and the momentum it acquired by traveling with the carrier B. The lower end of the chute J' discharges into a swing cradle $J^2$, which when swung downward (see Fig. 41) causes the cigar or other article to roll out of the cradle and down over a chute $J^3$ onto the upper run of an endless slowly traveling belt $J^4$ provided at intervals with retaining arms $J^5$ for the cigars to rest against, as illustrated in Fig. 41. Onto the top of the upper run of the belt $J^4$ extend the sides $J^6$, so that the cigars or other articles can accumulate in a pocket formed by the endless belt $J^4$, its advancing retaining arms, $J^5$, the chute $J^3$ and the sides $J^6$, as shown in Fig. 41, the cigars being removed by hand from the pocket when the latter reaches the outer end of the delivery device J. The cradle $J^2$ has its shaft $J^7$ journaled in a suitable bracket $A^{10}$ bolted to or forming part of the main frame A, and on the shaft $J^7$ is secured an arm $J^8$ adapted to be engaged by an arm $L^{10}$ forming an extension of the swing arm $L^2$ previously mentioned, and forming part of the device for imparting the intermittent rotary motion to the carrier B. Thus when the swing arm L² swings forward, the arm L¹⁰ imparts a swinging motion to the arm J⁸, to turn the shaft J⁷, with a view to swing the cradle J² downward into the position shown in Fig. 41, thus causing the cigar or other article held on the cradle to drop out of the latter and down the chute J³, as previously explained. It is understood that when the carrier B travels and the banded or labeled cigar or other article passes down the chute J', then the cradle J² is in an active or horizontal position, to receive the article from the lower end of the chute J', and when the carrier B is at a standstill and the swing arm L² is returned, then a swinging motion is given to the cradle for discharging the article therefrom. One of the sides J⁶ is fixed on a frame J⁹, while the other side is held adjustably secured thereon, as indicated in Fig. 42, to allow of moving the sides J⁶ the desired distance apart according to the length of the article to be banded or labeled. The frame J⁹ is supported near its outer end by a sectional brace J¹⁰ from the main frame A. The endless belt J⁴ travels in the direction of the arrow b' and passes over pulleys J¹¹ and J¹², of which the pulley J¹² is journaled in adjustable bearings J¹³ held on the outer end of the frame J⁹ (see Fig. 43), the inner end of the frame J⁹ being mounted to swing loosely on the shaft J¹⁴ carrying the pulley J¹¹. The shaft J¹⁴ is journaled on the bracket ket A⁹, and is provided with a worm wheel J¹⁵ in mesh with a worm J¹⁶ secured on a shaft J⁷ journaled on the bracket A¹⁰, and on the shaft J¹⁷ is secured a sprocket wheel J¹⁸ connected by a sprocket chain J¹⁹ with a sprocket wheel J²⁰ secured on the main shaft K, so that when the machine is running the gearing described imparts a slow traveling motion to the endless belt J⁴ in the direction of the arrow b'.
In the operation presently to be described reference is solely made to the machine as constructed for banding cigars, although it is evident that the machine may be used for banding or labeling other articles.
When the band holder D is filled with a pile of bands C, the hopper G is filled with cigars, and a rotary motion is given to the main shaft K, then the carrier B is caused to travel intermittently in the direction of the arrow a', and the endless delivery belt J⁴ is caused to travel continually but slowly in the direction of the arrow b'. When the machine is running and the several parts are in the position illustrated in Figs. 1, 2, 3, 4, 5, 6, 7, 8 and 9, then the endless carrier B is in the period of rest and a cigar band is delivered to the tape B³ by the transferring device E (see Fig. 9) and the gumming roller F' delivers adhesive substance to this band at the rear end thereof, the pile of bands in the holder D being supported by the supporting arms O. At this time the vacuum in the suction chamber E' is broken by the admission of air by way of the ports Q⁹, Q⁸, so that the cigar band is released by the suction in the chamber E' and is held to the tape B³ by the continuous suction action of the chamber N. During the previous travel of the carrier B a cigar band has been carried from the transferring device E to the article feed device H, and the cigar band during this travel assumed with the tape B³ the trough-like position. In the meantime, the feed wheels H'—H' commence to turn and a cigar rolls out of the feed wheels onto the chute H¹¹ and down the same during the rising of the cross head T', spring T and plunger U. The cigar finally clears the lower end of the spring T and rolls against the rising plunger U and finally clears the latter, to allow the cigar to continue its travel on the chute H¹¹ until it comes to a rest on the guide U⁴, the cigar then being immediately below the plunger U. A number of banded cigars is in the tubular portion of the former I' (see Fig. 23), and a previously banded cigar in the cradle J² is now discharged from the latter as the cradle J² swings downward during the time the swing arm L² is on the return stroke and the carrier B is at a standstill. The cross head T' now descends and with it the plunger U, the spring T and the guide U⁴ until the lower end of the latter about reaches the forward side of the former I' and extends on opposite sides of the front gummed end of the band, and the plunger in its descent engages the top of the cigar and forces the same downward, so that the cigar is pushed down into the open band and the trough-like tape B³, with the chute H¹¹ in the lowermost position and with its forked end straddling the rear non-gummed end of the band C, as shown in Fig. 45. The cross head T' now starts on the return or up stroke and carries the spring T and guide U⁴ along, at the same time allowing the chute H¹¹ to swing upward by the action of its overbalancing arm H¹². The jaw I² is now swung forward into a closed position by the action of the lever I⁴, so that the non-gummed end of the band C is folded over onto the cigar (see Fig. 46). During the rising of the cross head T' the feed wheels H'—H' begin to turn to allow another cigar to roll onto the chute H¹¹. A traveling motion is now given to the endless carrier B to cause the partly banded cigar to be carried forward into the tubular portion of the former I' (see Fig. 23), so that the front end of the band is gradually drawn in through the slot I¹⁴, thus overlapping the non-gummed end of the band, as plainly shown in Figs. 23 and 25. After the cigar has passed beyond the jaw I², the lever I⁴ swings rearward to allow the jaw I² to open by the action of its spring I³. The front end is only partly wrapped around the other end at this time, but the portion containing the adhesive substance is wrapped onto the other end, to fasten the ends of the band together. The final wrapping takes place at the next travel given to the carrier B, as will be understood by reference to Figs. 23 and 26, but the banded cigar is kept in the tubular portion until the next following travel given to the endless carrier B, so that the adhesive substance has a chance to dry. During the time the carrier B travels the suction chamber E' is caused to rise to the position shown in Fig. 10, so that the suction chamber E' now sustains the pile of cigar bands C in the holder D, the supporting arms O being withdrawn at the time the suction chamber E' reaches the uppermost position. When this takes place the valve Q connects the main suction chamber $N^4$ with the suction chamber E', so that the ends of the lowermost band of the pile of bands C are drawn down onto the beveled ends of the suction chamber E', after which the supporting arms O are returned under the ends of the next band C above, to support the pile of bands C. The suction chamber E' now descends with the suction holding the lowermost band C in position, and when the suction chamber moves into a lowermost position the carrier B comes to a standstill and the roller F' delivers the adhesive substance to the band. The above described operation is then repeated.

By the arrangement described a large number of cigars can be accurately banded in a comparatively short time and without manual handling of the cigars or bands, it being only necessary for the attendant of the machine when running to keep a pile of bands in the holder D and cigars in the hopper G and to empty from time to time the delivery pockets containing the banded cigars.

In the modified form illustrated in Figs. 49 to 58, the closing of the front end of the cigar band is accomplished by use of a jaw V instead of the closing front end, by the use of the spirally slotted tubular portion of the wrapping device I, as above explained. The jaw V is hinged to the front of the former I' opposite the jaw $I^2$, and the jaw V is pivotally connected by a link V' with a head $V^2$, mounted to swing on the upper end of a lever $V^3$ fulcrumed on the main frame A and connected with a bar $V^4$ extending transversely and carrying a friction roller $V^5$ in peripheral engagement with a cam $V^6$ secured to the cam shaft P adjacent to the cam $I^{11}$, used for imparting a swinging motion to the lever $I^4$, as before explained. A spring $V^7$ is connected with the lever $V^3$, to hold the friction roller $V^5$ in engagement with the peripheral face of the cam $V^6$, and the lever $V^3$ is provided with a stop screw $V^8$ for limiting the inward swinging motion of the lever $V^3$ and consequently limiting the closing motion of the jaw V, to prevent injury to the band and the like to be banded at the time. An L-shaped auxiliary jaw $V^{10}$ swings on the same pivot as the jaw V and is connected by a spring $V^{11}$ with the jaw V, it being understood that when the jaw V moves into a closing position, as indicated in Fig. 53, then the auxiliary jaw $V^{10}$ engages the front end of the band and presses the same in contact with the other or rear end of the band held in a closed position by the jaw $I^2$. The closing movement of the jaw V takes place immediately after the lever $I^4$ has swung back to its position of rest, and the jaw $I^2$ moves into an open position by the action of its spring $I^3$ (see Fig. 52). Now when the jaw V swings into a closing position it completely folds the front or gummed end of the band C onto the other non-gummed end, to complete the wrapping of the cigar. When this has been done the lever $V^3$ swings outward, thus swinging the jaw V into an open position. Thus it will be seen that the jaws $I^2$ and V are successively closed and likewise opened to complete the wrapping of the band around the cigar while in position in the former I' directly below the article feed device H.

By reference to Fig. 49, it will be seen that the entire former I' is trough-shaped from one end to the other.

In the modified form shown in Figs. 59, 60 and 61, the non-gummed rear end of the cigar band C is closed by the jaw $I^2$, as previously explained, and the front or gummed end of the cigar band is partly closed by a short spirally slotted tubular portion of the former I', and the final closing of the front end of the cigar band is accomplished by a separate device, which also holds the ends closed for a length of time, to allow the adhesive substance to dry properly. This device is mounted on a bracket W adapted to be secured to the main frame at $A^{14}$ (see Figs. 1, 59, 60 and 61). An endless sprocket chain W' is provided with spaced V-shaped blocks $W^2$ adapted to pass over the closed ends of the cigar bands as soon as the band emerges from the end of the slot $I^{14}$, and which slot terminates at the top of the tubular portion, as plainly indicated in Figs. 59 and 60. The V-shaped blocks $W^2$ travel with the band and the cigar carried forward by the carrier B, so that the adhesive substance can dry properly while the ends of the bands are held in a closed position by the blocks $W^2$. The sprocket chain W' travels intermittently in unison with the carrier B, and for this purpose the endless sprocket chain W' passes around the sprocket wheels $W^3$, $W^4$ journaled on the bracket W, the shaft $W^5$ of the sprocket wheel $W^3$ being provided with a sprocket wheel $W^6$ connected by a sprocket chain $W^7$ with a sprocket wheel $W^8$ secured on a shaft B¹⁰ receiving an intermittent turning motion from the main shaft K of the machine as above explained. For closing the cigar bands C², as illustrated in Figs. 70 and 71, and having a rear end C³ and a narrow gummed front end C⁴, the closing of the ends is accomplished while the cigar and band are on the carrier B directly below the cigar feeding device H. In this case the rear jaw I³ is provided with a cut out portion, as plainly shown in Fig. 66, into which is adapted to pass the front jaw X for folding the end C⁴ over onto the wide end C³, as illustrated in Fig. 71. The two jaws I² and X are closed successively, the jaw I² by the lever I⁴, and the jaw X by a mechanism such as shown and described in connection with the modified forms illustrated in Figs. 49 to 57, so that further description of the same is not deemed necessary. Now by the arrangement described the two jaws I² and X hold the ends of the bands closed a sufficient length of time for the adhesive substance to dry sufficiently to fasten the ends together.

It is understood that the several modified forms illustrated in Figs. 59 to 71 can be readily used on the machine as originally described, it being only necessary to change the former I' and to make the attachment above described and shown in Figs. 49 to 69.

Having thus described our invention, we claim as new and desire to secure by Letters Patent:

1. A machine for applying bands or labels to cigars and other articles, comprising the following instrumentalities in the sequence mentioned, namely, an intermittently moving carrier, means for delivering a band to the said carrier when at rest, means for holding the band to the said carrier, means for delivering the article to the band held on the said carrier when at rest, and means for closing the band around the article and overlapping the ends of the band.

2. A machine for applying bands or labels to cigars and other articles, comprising the following instrumentalities in the sequence mentioned, namely, an intermittently moving carrier, means for delivering a band to the said carrier when at rest, means for holding the band to the said carrier, means for applying an adhesive substance to the band, means for delivering the article to the band held on the said carrier when at rest, and means for closing the band around the article and overlapping the ends of the band.

3. A machine for applying bands or labels to cigars and other articles, comprising an endless intermittently traveling carrier, a suction device for holding the band or label by suction to the said carrier, a feeding device for feeding the article onto the said band and carrier at the time the latter is at rest, and means for wrapping the band around the article.

4. A machine for applying bands or labels to cigars and other articles, comprising an endless intermittently traveling carrier having spaced suction ports, a suction chamber over which passes the said carrier, the suction ports of the carrier being adapted to register with the said chamber, means for placing a band or label across the said carrier at a suction port, the band or label being held in place by the suction action, means for feeding the article onto the said carrier and over the band or label at the time the carrier is at rest, and means for wrapping the band or label around the article.

5. A machine for applying bands or labels to cigars and other articles, comprising an endless intermittently traveling web having spaced suction ports, a suction chamber over which passes the said web, the suction ports of the web being adapted to register with the said chamber, a suction feed for delivering the band to the said web at one of the registering suction ports, the band being held to the web by the suction action, means for delivering the article to the carrier over a band, and means for wrapping the band around the article.

6. A machine for applying bands or labels to cigars and other articles comprising an endless intermittently traveling web having spaced suction ports, a suction chamber over which passes the said web, the suction ports of the web being adapted to register with the said chamber, a suction feed for removing a band from a stack of bands and for delivering the band to the said web at one of the registering suction ports, the band being held to the web by the suction action, means for delivering the article to the carrier over a band, and means for wrapping the band around the article.

7. A machine for applying bands or labels to cigars and other articles, comprising an endless intermittently traveling web having spaced suction ports, a suction chamber over which passes the said web, the web having its suction ports adapted to register with the said chamber, a suction feed for delivering the band to the said web at one of the registering suction ports, the band being held to the web by the suction action, means for applying an adhesive substance to one end of the said band, means for delivering the article to the carrier over a band, and means for wrapping the band around the article.

8. A machine for applying bands or labels to cigars and other articles, comprising an endless intermittently traveling web having spaced suction ports, a suction chamber over which passes the said web, the web having its suction ports adapted to register with the said chamber, a suction feed for delivering the band to the said web at one of the registering suction ports, the band being held to the web by the suction action, means for applying an adhesive substance to one end of the said band while in position on the said band suction feed, means for delivering the article to the carrier over a band, and means for wrapping the band around the article.

9. A machine for applying bands to cigars and other articles, comprising a holder for holding a pile of bands, an endless traveling web having spaced suction ports, a suction chamber over which passes the said web, the web having its suction ports adapted to register with the said suction chamber, and a band suction device for engaging and removing a band from the said holder, the said suction device moving at an angle to the direction of the travel of the web, to deliver the band to the said web at a suction port and at a time the web is at a standstill.

10. A machine for applying bands to cigars and other articles, comprising a holder for holding a pile of bands, an endless traveling web having spaced suction ports, a suction chamber over which passes the said web, the web having its suction ports adapted to register with the said suction chamber, a band suction device for engaging and removing a band from the said holder, the said suction device moving at an angle to the direction of the travel of the web, to deliver the band to the said web at a suction port and at a time the web is at a standstill, and a feeding device for feeding an article onto the said band and web.

11. A machine for applying bands to cigars and other articles, comprising a holder for holding a pile of bands, an endless traveling web having spaced suction ports, a suction chamber over which passes the said web, the web having its suction ports adapted to register with the said suction chamber, a band suction device for engaging and removing a band from the said holder, the said suction device moving at an angle to the direction of the travel of the web to deliver the band to the said web at a suction port and at a time the web is at a standstill, a feeding device for feeding an article onto the said band and web, and means for closing the band and wrapping it around the article while on the said web.

12. A machine for applying bands to cigars and other articles, comprising a holder for holding a pile of bands, an endless traveling web having spaced suction ports, a suction chamber over which passes the said web, the web having its suction ports adapted to register with the said suction chamber, a band suction device for engaging and removing a band from the said holder, the said suction device moving at an angle to the direction of the travel of the web to deliver the band to the said web at a suction port and at a time the web is at a standstill, and means for applying an adhesive substance onto one end of the band while on the said suction device.

13. A machine for applying bands to cigars and other articles, comprising a holder for holding a pile of bands, an endless traveling web having spaced suction ports, means for imparting an intermittent traveling motion to the said web, the periodic movement of the web corresponding to the distance between adjacent suction ports, a suction chamber over which passes the said web, the web having its ports adapted to register with the said suction chamber, and a band suction device for engaging and removing a band from the said holder, the said suction device moving at an angle to the direction of the travel of the web to deliver the band to the said web at a suction port and at a time the web is at a standstill.

14. A machine for applying bands to cigars and other articles, comprising a holder for holding a pile of bands, an endless traveling web having spaced suction ports, means for imparting an intermittent traveling motion to the said web, the periodic movement of the web corresponding to the distance between adjacent suction ports, a suction chamber over which passes the said web, the web having its suction ports adapted to register with the said suction chamber, a band suction device for engaging and removing a band from the said holder, the said suction device moving at an angle to the direction of the travel of the web to deliver the band to the said web at a suction port and at a time the web is at a standstill, and a feeding device spaced from the said suction device and delivering the article to be banded onto the said band and web while the latter is at a standstill.

15. A machine for applying bands to cigars and other articles, comprising a holder for holding a pile of bands, an endless traveling web having spaced suction ports, means for imparting an intermittent traveling motion to the said web, the periodic movement of the web corresponding to the distance between adjacent suction ports, a suction chamber over which passes the said web, the web having its suction ports adapted to register with the said suction chamber, a band suction device for engaging and removing a band from the said holder, the said suction device moving at an angle to the direction of the travel of the web to deliver the band to the said web at a suction port and at a time the web is at a standstill, a feeding device spaced from the said suction device and delivering the article to be banded onto the said band and web while the latter is at a standstill, and means for applying an adhesive substance to the said band while on the said band suction device.

16. A machine for applying bands to cigars and other articles, comprising a holder for holding a pile of bands, an endless traveling web having spaced suction ports, means for imparting an intermittent traveling motion to the said web, the periodic movement of the web corresponding to the distance between adjacent suction ports, a suction chamber over which passes the said web, the web having its suction ports adapted to register with the said suction chamber, a band suction device for engaging and removing a band from the said holder, the said suction device moving at an angle to the direction of the travel of the web to deliver the band to the said web at a suction port and at a time the web is at a standstill, a feeding device spaced from the said suction device and delivering the article to be banded onto the said band and web while the latter is at a standstill, means for applying an adhesive substance to the said band while on the said band suction device, and means for closing the band and wrapping it around the article.

17. A machine for applying bands to cigars and other articles, provided with a holder for containing a pile of bands, an endless web having suction ports, a suction chamber over which passes the said web, and a band transferring device for engaging and removing a band from the said pile and transferring it to the web.

18. A machine for applying bands to cigars and other articles, provided with a holder for containing a pile of bands, an endless web having suction ports, a suction chamber over which passes the said web, and a band transferring device for engaging and removing a band from the said pile and transferring it to the web over one of the said suction ports, to cause the band to adhere by suction to the web.

19. A machine for applying bands to cigars and other articles provided with a holder for containing a pile of bands, an endless web having suction ports, a suction chamber over which passes the said web, and a band transferring device having an intermittent suction action, for engaging and removing a band from the said pile of bands by suction, for holding the band in place while transferring it to the said web, and for releasing the band by cutting off the suction of the transferring device at the time the band is on the said web.

20. A machine for applying bands to cigars and other articles, provided with a holder for containing a pile of bands, an endless web having suction ports, a suction chamber over which passes the said web, and a band transferring device having an intermittent suction action for engaging and removing a band from the said pile of bands by suction, for holding the band in place while transferring it to the said web, and for releasing the band by cutting off the suction of the transferring device at the time the band is on the said web and over one of the said suction ports.

21. A machine for applying bands to cigars and other articles, provided with a holder for containing a pile of bands, an endless web having suction ports, a suction chamber over which passes the said web, a band transferring device for engaging and removing a band from the said pile and transferring it to the web, and a device for applying an adhesive substance to the band while on the said transferring device.

22. A machine for applying bands to cigars and other articles, provided with a vertically disposed U-shaped suction device and movable means for supporting bands above said device, so that when said device is raised it engages the lowest band and when lowered withdraws it from the pile, leaving all other bands in said supporting means.

23. A machine for applying bands to cigars and other articles, provided with a holder for containing a pile of bands, an endless web having suction ports, a suction chamber over which passes the said web, and a band transferring device having a U-shaped suction chamber straddling a run of the said web, the open ends of the said chamber being adapted to engage the ends of the lowermost band of the said pile of bands, to cause the said lowermost band to adhere to the said open ends by the suction in the chamber.

24. A machine for applying bands to cigars and other articles, provided with a holder for containing a pile of bands, an endless web having suction ports, a suction chamber over which passes the said web, a band transferring device having a U-shaped suction chamber straddling a run of the said web, the open ends of the said chamber being adapted to engage the ends of the lowermost band of the said pile of bands, to cause the said lowermost band to adhere to the said open ends by the suction in the chamber, and means for imparting an intermittent reciprocating movement to the said suction chamber.

25. A machine for applying bands to cigars and other articles, provided with a holder for containing a pile of bands, an endless web having suction ports, a suction chamber over which passes the said web, a band transferring device having a U-shaped suction chamber straddling a run of the said web, the open ends of the said chamber being adapted to engage the ends of the lowermost band of the said pile of bands to cause the said lowermost band to adhere to the said open ends by the suction in the chamber, a valve for controlling the suction action of the said chamber, and means for imparting an intermittent reciprocating movement to the said suction chamber.

26. A machine for applying bands to cigars and other articles, provided with a holder for containing a pile of bands, an endless web having suction ports, a suction chamber over which passes the said web, a band transferring device having a U-shaped suction chamber straddling a run of the said web, the open ends of the said chamber being adapted to engage the ends of the lowermost band of the said pile of bands, to cause the said lowermost band to adhere to the said open ends by the suction in the chamber, and means for imparting an intermittent reciprocating movement to the said suction chamber, to bring the open ends thereof alternately in register with the said endless web and the said lowermost band of the said pile of bands.

27. A machine for applying bands to cigars and other articles, provided with a pneumatic device for holding a band in place, a pasting roller adapted to pass over a portion of said band and out of contact therewith, and on its return movement in contact with said band, and means for applying an adhesive to said roller.

28. A machine for applying bands to cigars and other articles, provided with a device for holding a band in place, a pasting roller adapted to pass over the band at one end thereof to apply an adhesive substance to the band, a lever mounted to swing, an arm pivoted on the said lever and carrying the said pasting roller, a paste fountain having a roller adapted to be engaged by the said pasting roller, an adjustable guide for the return movement of the said arm, and a spring-pressed swing guide for guiding the arm in its forward movement.

29. A machine for applying bands to cigars and other articles, provided with an endless carrier comprising a belt, and a tape secured at its middle to the said belt, to allow the tape to bend into a trough-like form.

30. A machine for applying bands to cigars and other articles, provided with an endless carrier comprising a belt having a raised portion along the middle of the belt, and a tape secured at its middle to the said raised portion to allow the tape to bend into a trough-like form.

31. A machine for applying bands to cigars and other articles, provided with an endless carrier comprising a belt having a raised portion along the middle of the belt, a tape secured at its middle to the said raised portion to allow the tape to bend into a trough-like form, the said belt and tape being perforated at the raised portion to form spaced suction ports, and a suction chamber over which passes the said carrier.

32. A machine for applying bands to cigars and other articles, provided with an endless carrier comprising a belt having a raised portion along the middle of the belt, a tape secured at its middle to the said raised portion to allow the tape to bend into a trough-like form, and raised transversely extending spaced portions on the upper face of the said tape.

33. A machine for applying bands to cigars and other articles, provided with an endless carrier comprising a belt having a raised portion along the middle of the belt, a tape secured at its middle to the said raised portion to allow the tape to bend into a trough-like form, raised transversely extending spaced portions on the upper face of the said tape, the said belt and tape being perforated at the raised portions to form spaced suction ports, and a suction chamber over which passes the said carrier.

34. A machine for applying bands to cigars and other articles provided with an endless carrier comprising a belt having a raised portion along the middle of the belt, a tape, and eyelets extending through the belt and tape at the said raised portions, the eyelets forming spaced suction ports.

35. A machine for applying bands to cigars and other articles provided with an endless carrier comprising a belt having a raised portion along the middle of the belt, a tape, eyelets extending through the belt and tape at the said raised portions, the eyelets forming spaced suction ports, and sprocket chains secured to the under side of the said belt.

36. A machine for applying bands to cigars and other articles provided with a carrier having a flexible tape secured at its middle thereto for carrying the band and the article, and a former for the passage of the flexible tape, the band and the article, to bend the tape and the band into trough shape for the reception of the article.

37. A machine for applying bands to cigars and other articles provided with an endless carrier, and a flexible tape secured at its middle to the said carrier for carrying the band and the article, and a former for the passage of the flexible tape, the band and the article, to bend the tape and the band into trough-shape for the reception of the article, the said former terminating in a tube having a lengthwise extending slot.

38. A machine for applying bands to cigars and other articles, provided with an endless carrier having a flexible tape secured at its middle thereto for carrying the band and the article, and a former for the passage of the flexible tape, the band and the article, to bend the tape and the band into trough-shape for the reception of the article, the said former terminating in a tube having a spiral slot for the passage of one end of the band to wrap the said end around the article and over the other end of the band.

39. A machine for applying bands to cigars and other articles, provided with an endless carrier having a flexible tape secured at its middle thereto for carrying the band and the article, a former for the passage of the flexible tape, the band and the article, to bend the tape and the band into trough-shape for the reception of the article, and means for successively bending the ends over onto the article, one end overlapping the other end.

40. A machine for applying bands to cigars and other articles, provided with an endless carrier having a tape and suction ports, a suction chamber over which passes the said carrier, and a fixed former of trough-shape and slotted at the bottom to permit the tape to travel in the former and to assume the shape thereof.

41. A machine for applying bands to cigars and other articles, provided with an endless carrier having a flexible tape secured at its middle to the carrier, the said tape being adapted to receive the band and the article, and a fixed trough-like former extending over the said carrier and having a slot in its bottom for the tape to pass into and travel in the said former and assume the shape thereof.

42. A machine for applying bands to cigars and other articles, provided with an endless carrier having a flexible tape secured at its middle to the carrier, the said tape being adapted to receive the band and the article, a fixed trough-like former extending over the said carrier and having a slot in its bottom for the tape to pass into, and travel in the said former and assume the shape thereof, a jaw hinged to one side of the said former, and means for closing the said jaw to fold the end of the band over onto the article.

43. A machine for applying bands to cigars and other articles, provided with an endless carrier having a flexible tape secured at its middle to the carrier, the said tape being adapted to receive the band and the article, a fixed trough-like former extending over the said carrier and having a slot in its bottom for the tape to pass into and travel in the said former and assume the shape thereof, and a suction chamber connected with ports formed in the said carrier and its tape, to hold the band in place on the tape.

44. A machine for applying bands to cigars and other articles, provided with an endless carrier having a flexible tape secured at its middle to the carrier, the said tape being adapted to receive the band and the article, a fixed trough-like former extending over the said carrier and having a slot in its bottom for the tape to pass into and travel in the said former and assume the shape thereof, a suction chamber connected with ports formed in the said carrier and its tape, to hold the band in place on the tape, and means for closing the ends of the band.

45. A machine for applying bands to cigars and other articles, provided with an endless carrier having a flexible tape secured at its middle to the carrier, the said tape being adapted to receive the band and the article, a fixed trough-like former extending over the said carrier and having a slot in its bottom for the tape to pass into and travel in the said former and assume the shape thereof, a suction chamber connected with ports formed in the said carrier and its tape, to hold the band in place on the tape, a closing jaw hinged to one side of the former opposite a suction port, and means for closing the jaw to feed one end of the band over onto the article.

46. A machine for applying bands to cigars and other articles, provided with an endless carrier having a flexible tape secured at its middle to the carrier, the said tape being adapted to receive the band and the article, a fixed trough-like former extending over the said carrier and having a slot in its bottom for the tape to pass into and travel in the said former and assume the shape thereof, a suction chamber connected with ports formed in the said carrier and its tape, to hold the band in place on the tape, a closing jaw hinged to one side of the former opposite a suction port, means for closing the jaw to fold one end of the band over onto the article, and a closing tube forming a continuation of the said former and having a spiral slot for the passage of the other end of the band, to close the same and to overlap the other end.

47. A machine for applying bands to cigars and other articles, provided with an endless carrier having a flexible tape secured at its middle to the carrier, the said tape being adapted to receive the band and the article, a fixed trough-like former extending over the said carrier and having a slot in its bottom for the tape to pass into, and travel in the said former and assume the shape thereof, a suction chamber connected with ports formed in the said carrier and its tape, to hold the band in place on the tape, a closing jaw hinged to one side of the former opposite a suction port, means for closing the jaw to fold one end of the band over onto the article, and a closing tube forming a continuation of the former and having a spiral slot starting at the side of the former opposite the one on which the jaw is located, the slot being adapted to receive the other end of the band to close the same and to overlap the other end.

48. A machine for applying bands to cigars and other articles, provided with an endless carrier having a flexible tape secured at its middle to the carrier, the said tape being adapted to receive the band and the article, a fixed trough-like former extending over the said carrier and having a slot in its bottom for the tape to pass into and travel in the said former and assume the shape thereof, a suction chamber connected with ports formed in the said carrier and its tape, to hold the band in place on the tape, a closing jaw hinged to one side of the former opposite a suction port, means for closing the jaw to feed one end of the band over onto the article, and a closing tube forming a continuation of the former and having a spiral slot starting at the side of the former opposite the one on which the jaw is located, the slot making approximately a half turn, and the slot being adapted to receive the other end of the band, to close the same and to overlap the other end.

49. A machine for applying bands to cigars and other articles, provided with an endless carrier having a flexible tape secured at its middle to the carrier, the said tape being adapted to receive the band and the article, a fixed trough-like former extending over the said carrier and having a slot in its bottom for the tape to pass into, and travel in the said former and assume the shape thereof, a suction chamber connected with ports formed in the said carrier and its tape, to hold the band in place on the tape, a closing jaw hinged to one side of the former opposite a suction port, means for closing the jaw to fold one end of the band over onto the article, and a closing tube forming a continuation of the said former and having a slot of spiral shape during a portion of its length, and straight during the remainder of the tube.

50. A machine for applying bands to cigars and other articles, provided with a suction chamber open at the top, an endless carrier having a belt adapted to pass over the said suction chamber, and a flexible tape secured along its middle to a longitudinally extending raised portion on the face of the belt, the said carrier being provided with spaced suction ports extending through the belt and the tape, and in communication with the said suction chamber, the length of the latter accommodating two of the ports at a time, a band feed for feeding a band onto the tape at one suction port in register with the suction chamber, and an article feed located in advance of the said label feed over the carrier at the next forward suction port in register with the said suction chamber, and means for imparting an intermittent traveling motion to the said carrier, the latter being at rest at the time a suction port is at the said label feed and another suction port is at the article feed.

51. A machine for applying bands to cigars and other articles, provided with a suction chamber open at the top, an endless carrier having a belt adapted to pass over the said suction chamber and a flexible tape secured along its middle to a longitudinally extending raised portion on the face of the belt, the said carrier being provided with spaced suction ports extending through the belt and the tape and in communication with the said suction chamber, the length of the latter accommodating two of the ports at a time, a band feed for feeding a band onto the tape at one suction port in register with the suction chamber and an article feed located in advance of the said label feed over the carrier at the next forward suction port in register with the said suction chamber, means for imparting an intermittent traveling motion to the said carrier, the latter being at rest at the time a suction port is at the said label feed and another suction port is at the article feed, and a former at the said article feed for the passage of the flexible tape and for bending the tape and band into trough shape for the reception of the article.

52. A machine for applying bands to cigars and other articles, provided with a suction chamber open at the top, an endless carrier having a belt adapted to pass over the said suction chamber and a flexible tape secured along its middle to a longitudinally extending raised portion on the face of the belt, the said carrier being provided with spaced suction ports extending through the belt and the tape, and in communication with the said suction chamber, the length of the latter accommodating two of the ports at a time, a band feed for feeding a band onto the tape at one suction port in register with the suction chamber and an article feed located in advance of the said label feed over the carrier at the next forward suction port in register with the said suction chamber, means for imparting an intermittent traveling motion to the said carrier, the latter being at rest at the time a suction port is at the said label feed and another suction port is at the article feed, a former at the said article feed for the passage of the flexible tape and for bending the tape and band into trough shape for the reception of the article, and means for closing the ends of the band over the article and overlapping one end over the other.

53. In a machine for applying bands to cigars and other articles, the combination with an endless intermittently traveling carrier supporting a band, of an article feeding device for delivering an article onto the said band and carrier, comprising an intermittently rotating article holder, a swing chute for the article to roll onto from the said holder, and a plunger operating in conjunction with the said chute to deliver the article to the said band and carrier.

54. In a machine for applying bands to cigars and other articles, the combination of a trough-like former, an endless carrier in the said former and conforming to the shape thereof to hold the band in a like form, and an article feeding device for delivering the article lengthwise into the said trough-shaped band and carrier.

55. In a machine for applying bands to cigars and other articles, the combination of a trough-like former, an endless carrier in the said former and conforming to the shape thereof to hold the band in a like form, and an article feeding device for delivering the article lengthwise into the said trough-shaped band and carrier, the said device having an intermittently rotating feed wheel and means for conducting the article from the feed wheel into the band and carrier.

56. In a machine for applying bands to cigars and other articles, the combination of a trough-like former, an endless carrier in the said former and conforming to the shape thereof to hold the band in a like form, an intermittently rotating feed wheel carrying the articles, a chute for the articles to pass on successively from the said feed wheel, and a plunger operating in conjunction with the said chute for delivering the article to the open band and carrier.

57. In a machine for applying bands to cigars and other articles, the combination of a trough-like former, an endless carrier in the said former and conforming to the shape thereof to hold the band in a like form, an intermittently rotating feed wheel carrying the articles, a counterbalanced swinging chute for the articles to pass on successively from the said feed wheel, and a plunger operating in conjunction with the said chute for delivering the article to the open band and carrier.

58. In a machine for applying bands to cigars and other articles, the combination of a trough-like former, an endless carrier in the said former and conforming to the shape thereof to hold the band in a like form, an intermittently rotating feed wheel carrying the articles, a chute for the articles to pass on successively from the said feed wheel, a plunger operating in conjunction with the said chute for delivering the article to the open band and carrier, and a guide in front of the plunger and for guiding the article in its passage from the chute.

59. In a machine for applying bands to cigars and other articles, the combination of a trough-like former, an endless carrier in the said former and conforming to the shape thereof to hold the band in a like form, an intermittently rotating feed wheel carrying the articles, a chute for the articles to pass on successively from the said feed wheel, a plunger operating in conjunction with the said chute for delivering the article to the open band and carrier, and a guide in front of the plunger and for guiding the article in its passage from the chute, the said guide being actuated by the said plunger.

60. In a machine for applying bands to cigars and other articles, the combination of a trough-like former, an endless carrier in the said former and conforming to the shape thereof to hold the band in a like form, an intermittently rotating feed wheel carrying the articles, a chute for the articles to pass on successively from the said feed wheel, a plunger operating in conjunction with the said chute for delivering the article to the open band and carrier, means for imparting a reciprocating motion to the said plunger, a guide in front of the plunger, and means for actuating the guide from the said plunger.

61. In a machine for applying bands to cigars and other articles, the combination of a trough-like former, an endless carrier in the said former and conforming to the shape thereof to hold the band in a like form, an intermittently rotating feed wheel carrying the articles, a chute for the articles to pass on successively from the said feed wheel, a plunger operating in conjunction with the said chute for delivering the article to the open band and carrier, means for imparting a reciprocating motion to the said plunger, a guide in front of the plunger, and means for actuating the guide intermittently up and down from the said plunger.

62. In a machine for applying bands to cigars and other articles, the combination of a trough-like flexible carrier holding a band in open or trough shape, and an article feeding device for feeding an article into the said open band and lengthwise into the carrier.

63. In a machine for applying bands to cigars and other articles, the combination of a trough-like flexible carrier holding a band in open or trough shape, and a yieldingly mounted reciprocating plunger for pressing the article into the said open band and lengthwise into the trough-like carrier.

64. In a machine for applying bands to cigars and other articles, the combination of a trough-like flexible carrier holding a band in open or trough shape, a yieldingly mounted reciprocating plunger for pressing the article into the said open band and lengthwise into the trough-like carrier, a guide in front of the plunger and intermittently traveling with the same, and a delivery chute at the rear of the plunger for delivering the article against the said guide and underneath the plunger.

65. In a machine for applying bands to cigars and other articles, the combination of a flexible carrier, means for placing a band transversely onto the carrier, a former for bending the carrier and band into trough shape, and means for delivering the article into the band and lengthwise into the carrier.

66. In a machine for applying bands to cigars and other articles, the combination of a flexible carrier, means for placing a band transversely onto the carrier, a former for bending the carrier and band into trough shape, means for delivering the article into the band and lengthwise into the carrier, and means for closing the ends of the band around the article.

67. In a machine for applying bands to cigars and other articles, the combination of a flexible carrier, means for placing a band transversely onto the carrier, means for applying an adhesive substance to one end of the band, a former for bending the carrier and band into trough shape, and means for delivering the article into the band and lengthwise into the carrier.

68. In a machine for applying bands to cigars and other articles, the combination of a flexible carrier, means for placing a band transversely onto the carrier, means for applying an adhesive substance to one end of the band, a former for bending the carrier and band into trough shape, means for delivering the article into the band and lengthwise into the carrier, and means for first bending the non-gummed end of the band onto the article and then bending the gummed end onto the other end of the band.

69. In a machine for applying bands to cigars and other articles, the combination of a flexible carrier, means for placing a band transversely onto the carrier, means for applying an adhesive substance to one end of the band, a former for bending the carrier and band into trough shape, means for delivering the article into the band and lengthwise into the carrier, a movable jaw on one side of the carrier for bending the non-gummed end of the band onto the article, and a tube for the passage of the carrier, and article, the tube having a spiral slot starting from the other side of the carrier, the said gummed end of the band passing through the slot and being bent over onto the non-gummed end of the band.

70. In a machine for applying bands to cigars and other articles, the combination of a flexible carrier, means for placing a band transversely onto the carrier, means for applying an adhesive substance to one end of the band, a former for bending the carrier and band into trough shape, means for delivering the article into the band and lengthwise into the carrier, means for first bending the non-gummed end of the band onto the article and then bending the gummed end onto the other end of the band, and means for pressing the overlapped ends of the bands.

71. In a machine for applying bands to cigars and other articles, the combination of a flexible carrier, means for placing a band transversely onto the carrier, means for applying an adhesive substance to one end of the band, a former for bending the carrier and band into trough shape, means for delivering the article into the band and lengthwise into the carrier, means for first bending the non-gummed end of the band onto the article and then bending the gummed end onto the other end of the band, means for imparting a traveling motion to the said carrier, and means for pressing the overlapped ends of the band while traveling with the carrier.

72. In a machine for applying bands to cigars and other articles, the combination of a flexible carrier, means for placing a band transversely onto the carrier, means for applying an adhesive substance to one end of the band, a former for bending the carrier and band into trough shape, means for delivering the article into the band and lengthwise into the carrier, a spring-pressed swing jaw on one side of the carrier and normally held open by its spring, a lever for engaging the said jaw to swing the same into a closing position for bending the non-gummed end of the band onto the article, and means for subsequently bending the gummed end over onto the non-gummed end of the band.

73. In a machine for applying bands to cigars and other articles, the combination of an intermittently traveling carrier supporting a band, an intermittently rotating feed wheel having peripheral notches for supporting the article, a gravity swing chute operating in conjunction with the said feed wheel for the article to roll out of the wheel onto the said chute, a reciprocating cross head over the said carrier and in front of the said wheel and the said chute, a plunger on the said cross head, a spring on the said cross head for holding the articles from rolling out of the feed wheel, and a guide moving with the said cross head and limiting the movement of the article rolling down the said chute.

74. In a machine for applying bands to cigars and other articles, the combination of an intermittently traveling carrier supporting a band, an intermittently rotating feed wheel having peripheral notches for supporting the article, a gravity swing chute operating in conjunction with the said feed wheel for the article to roll out of the wheel onto the said chute, a reciprocating cross head over the said carrier and in front of the said wheel and the said chute, a plunger on the said cross head, a spring on the said cross head for holding the articles from rolling out of the feed wheel, a guide moving with the said cross head and limiting the movement of the article rolling down the said chute, and means for causing an intermittent sliding motion of the said guide on the said cross head.

75. In a machine for applying bands to cigars and other articles, the combination of an intermittently traveling carrier supporting a band, an intermittently rotating feed wheel having peripheral notches for supporting the article, a gravity swing chute operating in conjunction with the said feed wheel for the article to roll out of the wheel onto the said chute, a reciprocating cross head over the said carrier and in front of the said wheel and the said chute, a plunger on the said cross head, a spring on the said cross head for holding the articles from rolling out of the feed wheel, and a guide mounted to slide intermittently on the front of the said cross head, the guide having arms transversely adjustable.

76. In a machine for applying bands to cigars and other articles, the combination of an intermittently traveling carrier supporting a band, an intermittently rotating feed wheel having peripheral notches for supporting the article, a gravity swing chute operating in conjunction with the said feed wheel for the article to roll out of the wheel onto the said chute, a reciprocating cross head over the said carrier and in front of the said wheel and the said chute, a plunger on the said cross head, a spring on the said cross head for holding the articles from rolling out of the feed wheel, and a guide mounted to slide on the said cross head and having arms adapted to be swung transversely and fastening means for fastening the arms in place on the guide.

77. In a machine of the class described, the combination with an endless carrier for carrying the banded article, a chute extending with its entrance onto the said carrier for the article to pass from the carrier onto the chute and down the same, a cradle for receiving the article at the delivery end of the chute, an arm on the shaft of said cradle and means for imparting a swinging motion to said arm to swing the cradle downward.

78. In a machine of the class described, the combination with an endless carrier for carrying the banded article, a downwardly inclined chute extending with its entrance end onto the top of said carrier for the article to pass from the carrier onto the chute and down the same, a cradle for receiving the article at the delivery end of the chute, and an endless belt for receiving the article from the said cradle, the said belt being provided with spaced retaining arms.

79. In a machine of the class described, the combination with an endless carrier for carrying the banded article, a chute extending with its entrance end onto the said carrier for the article to pass from the carrier onto the chute and down the same, a cradle for receiving the article at the delivery end of the chute, an arm on the shaft of the cradle, means for swinging the said arm to turn the shaft and swing the cradle downward, and an endless belt for receiving the article from the cradle when the latter is swung downward.

80. In a machine of the class described, the combination with an endless carrier for carrying the banded article, a chute extending with its entrance end onto the said carrier for the article to pass from the carrier onto the chute and down the same, a cradle for receiving the article at the delivery end of the chute, means for swinging the cradle, an endless belt for receiving the article from the cradle when the latter is swung downward, and a chute between the cradle and the endless belt for the article to roll down easy from the cradle to the belt.

81. In a machine of the class described, the combination with an endless carrier for carrying the banded article, a chute extending with its entrance end onto the said carrier for the article to pass from the carrier onto the chute and down the same, a cradle for receiving the article at the delivery end of the chute, means for swinging the cradle, an endless belt for receiving the article from the cradle when the latter is swung downward, and arms on the said belt and spaced apart.

82. In a machine of the class described, the combination with an endless carrier for carrying the banded article, a chute extending with its entrance onto the said carrier for the article to pass from the carrier onto the chute and down the same, a cradle for receiving the article at the delivery end of the chute, an endless belt for receiving the article from the said cradle, a chute between the cradle and the endless belt, means for imparting an intermittent traveling motion to the said carrier, and means for imparting an intermittent swinging motion to the said cradle.

83. In a machine of the class described, the combination with an endless carrier for carrying the banded article, a chute extending with its entrance end onto the said carrier for the article to pass from the carrier onto the chute and down the same, a cradle for receiving the article at the delivery end of the chute, an endless belt for receiving the article from the said cradle, a chute between the cradle and the endless belt, means for imparting an intermittent traveling motion to the said carrier, means for imparting an intermittent swinging motion to the said cradle, and means for imparting a continuous traveling motion to the said belt.

84. In a machine of the class described, the combination with an endless carrier for carrying the banded article, a chute extending with its entrance end onto the said carrier for the article to pass from the carrier onto the chute and down the same, a cradle for receiving the article at the delivery end of the chute, means for swinging the cradle, an endless belt for receiving the article from the cradle when the latter is swung downward, a chute between the cradle and the endless belt for the article to roll down easy from the cradle to the belt, and sides on top of the said belt.

85. In a machine of the class described, the combination with an endless carrier for carrying the banded article, a chute extending with its entrance end onto the said carrier for the article to pass from the carrier onto the chute and down the same, a cradle for receiving the article at the delivery end of the chute, means for swinging the cradle, an endless belt for receiving the article from the cradle when the latter is swung downward, a chute between the cradle and the endless belt for the article to roll down easy from the cradle to the belt, sides on top of the said belt, and means for adjusting one side toward or from the other.

86. A machine for applying bands to cigars and other articles provided with a band transferring device, comprising a U-shaped suction chamber beveled and open at the ends for engagement with the ends of a band, means for imparting a reciprocating motion to the said chamber and a valve for intermittently controlling the suction action of the said chamber.

87. A machine for applying bands to cigars and other articles, provided with a band transferring device comprising a U-shaped suction chamber beveled and open at the ends for engagement with the ends of a band, means for imparting an intermittent reciprocating motion to said chamber, and a valve for intermittently controlling the suction action of the said chamber, the said valve cutting off the suction action during the time the chamber is traveling in one direction, and permitting suction during the time the chamber is traveling in the opposite direction.

88. A machine for applying bands to cigars and other articles, provided with a support adapted to engage the lowermost band of a pile of bands to support the latter and to form a space between the lowermost band and the next one above, and means adapted to pass into said space to support the pile of bands on withdrawing the said support.

89. A machine for applying bands to cigars and other articles, provided with a suction chamber adapted to engage the lowermost band of a pile of bands to support the latter, the suction chamber having its ends beveled to draw the ends of the lowermost band downward to form spaces between the ends of the lowermost band and the next one above.

90. A machine for applying bands to cigars and other articles, provided with a suction chamber adapted to engage the lowermost band of a pile of bands to support the latter, the suction chamber having its ends beveled to draw the ends of the lowermost band downward to form spaces between the ends of the lowermost band and the next band above, and supporting means adapted to pass into the said space to support the pile of bands on withdrawing the said suction chamber and the lowermost band.

91. A machine for applying bands to cigars and other articles, provided with a suction chamber adapted to engage the lowermost band of a pile of bands to support the latter, the suction chamber having its ends beveled to draw the ends of the lowermost band downward to form spaces between the ends of the lowermost band and the next band above, supporting means adapted to pass into the said spaces to support the pile of bands on withdrawing the said suction chamber and the lowermost band, and actuating means for imparting motion to the said suction chamber and the said supporting means.

92. A machine for applying bands to cigars and other articles, provided with a band holder for holding a pile of bands, a suction chamber capable of moving toward and from the lowermost band of said pile of bands, the said suction chamber having suction arms beveled at the top for engagement with the ends of the lowermost band, to draw the said band ends downward, and movable supports adapted to pass into the space between the said ends of the lowermost band and the next one above.

93. A machine for applying bands to cigars and other articles, provided with a U-shaped suction chamber having the open ends beveled outwardly and downwardly, means for imparting movement to the said suction chamber to move the same in supporting position under a pile of bands, and movable supports engaging the ends of the lowermost band of the pile of bands and adapted to be withdrawn from underneath the pile to allow the ends of the lowermost band to be drawn downward onto the beveled ends of the suction chamber.

94. A machine for applying bands to cigars and other articles, provided with a U-shaped suction chamber having the open ends beveled outwardly and downwardly, means for imparting movement to the said suction chamber to move the same in supporting position under a pile of bands, and movable supports engaging the ends of the lowermost band of the pile of bands and adapted to be withdrawn from underneath the pile to allow the ends of the lowermost band to be withdrawn downward onto the beveled ends of the suction chamber, the said supports being adapted to move into the space between the ends of the lowermost band and the next band above, to support the pile of bands on withdrawing the suction chamber and the lowermost band.

95. A machine of the class described, provided with a label holder having oppositely disposed V-shaped standards for the ends of a pile of bands or labels to abut against to center the pile of bands or labels, and means for adjusting the said standards toward or from each other.

96. A machine of the class described, provided with a label holder having oppositely disposed V-shaped standards for the ends of a pile of bands or labels to abut against to center the pile of bands or labels, means for adjusting the said standards toward or from each other, and rods adjustable toward and from each other and engaging opposite sides of the pile of bands or labels.

97. In a machine of the class described, means for holding a pile of labels, said means including reciprocating tongues which at times support said pile, pneumatic means adapted to rest against the lowest label of said pile and hold said lowest label slightly flexed and means for reciprocating said tongues so that they support said pile when not supported by the said pneumatic means and cause said tongues to enter between said lowest label and the pile while said lowest label is flexed.

In testimony whereof we have signed our names to this specification in the presence of two subscribing witnesses.

CHARLES WAGNER.
FRANCIS X. MALOCSAY.

Witnesses:
THEO. G. HOSTER,
EVERARD B. MARSHALL.